(12) United States Patent
Matsumoto

(10) Patent No.: US 9,516,469 B2
(45) Date of Patent: Dec. 6, 2016

(54) POSITIONING SYSTEM, TERMINAL DEVICE, RECORDING MEDIUM, AND POSITIONING METHOD

(71) Applicant: MegaChips Corporation, Osaka-shi (JP)

(72) Inventor: Mahito Matsumoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 89 days.

(21) Appl. No.: 14/382,899

(22) PCT Filed: Feb. 28, 2013

(86) PCT No.: PCT/JP2013/055278
§ 371 (c)(1),
(2) Date: Sep. 4, 2014

(87) PCT Pub. No.: WO2013/133111
PCT Pub. Date: Sep. 12, 2013

(65) Prior Publication Data
US 2015/0042451 A1 Feb. 12, 2015

(30) Foreign Application Priority Data
Mar. 6, 2012 (JP) ................................ 2012-048938

(51) Int. Cl.
*G08C 19/00* (2006.01)
*H04W 4/02* (2009.01)
(Continued)

(52) U.S. Cl.
CPC ............ *H04W 4/027* (2013.01); *G01C 21/165* (2013.01); *G06Q 20/20* (2013.01); *G06Q 20/3224* (2013.01); *G07C 9/00007* (2013.01); *G01C 21/16* (2013.01); *G01C 21/20* (2013.01)

(58) Field of Classification Search
CPC ...... G01C 21/00; G01C 21/16; G01C 21/20; G01C 21/165
USPC ........................................................ 340/5.61
See application file for complete search history.

(56) References Cited

U.S. PATENT DOCUMENTS 9,083,813 B2 * 7/2015 Sekita ................. H04M 1/7253
2003/0236614 A1 * 12/2003 Yamakita ............... G01C 21/20
701/500

(Continued)

FOREIGN PATENT DOCUMENTS

JP       08-043113 A      2/1996
JP     2002-298169 A     10/2002

(Continued)

OTHER PUBLICATIONS

International Search Report issued Apr. 9, 2013 in PCT/JP2013/055278 filed Feb. 28, 2013.

(Continued)

*Primary Examiner* — Firmin Backer
*Assistant Examiner* — Adnan Aziz
(74) *Attorney, Agent, or Firm* — Oblon, McClelland, Maier & Neustadt, L.L.P.

(57) ABSTRACT

A positioning system is provided with a cell phone, a ticket gate having a known absolute position, and a housing of the ticket gate which regulates a traveling direction of a user to be a reference direction. The cell phone is provided with a contactless IC card portion adapted to acquire individual information of the ticket gate, a position identification portion adapted to acquire the absolute position of the ticket gate in accordance with the individual information to identify an absolute position of the user, an acceleration sensor adapted to detect an acceleration, an angular velocity sensor adapted to detect an angular velocity, a calibration portion adapted to calibrate the acceleration sensor and the angular velocity sensor in accordance with detection results therefrom when the cell phone is substantially stationary, and an orientation identification portion adapted to identify an orientation in accordance with measured values of the acceleration sensor and the angular velocity sensor when the housing regulates the traveling direction of the user to be the reference direction.

14 Claims, 10 Drawing Sheets

(51) Int. Cl.
*G06Q 20/20* (2012.01)
*G06Q 20/32* (2012.01)
*G07C 9/00* (2006.01)
*G01C 21/16* (2006.01)
*G01C 21/20* (2006.01)

(56) References Cited

U.S. PATENT DOCUMENTS

| | | | |
|---|---|---|---|
| 2010/0234062 A1* | 9/2010 | Ito | G01C 17/30 455/550.1 |
| 2011/0106450 A1* | 5/2011 | Toda | G01C 21/165 701/472 |
| 2011/0112752 A1* | 5/2011 | Yokozawa | G01C 21/165 701/532 |
| 2011/0279241 A1* | 11/2011 | Sugano | G06K 19/0702 340/10.5 |
| 2012/0010778 A1* | 1/2012 | Akatsuka | G01C 21/165 701/32.3 |
| 2012/0062414 A1* | 3/2012 | Sambongi | G01C 21/165 342/357.25 |
| 2013/0304736 A1* | 11/2013 | Miyazaki | G06F 17/30241 707/736 |
| 2014/0180626 A1* | 6/2014 | Kimishima | G01C 22/006 702/142 |

FOREIGN PATENT DOCUMENTS

| | | |
|---|---|---|
| JP | 2006-010563 A | 1/2006 |
| JP | 3837533 B2 | 10/2006 |
| JP | 2007-309803 A | 11/2007 |
| JP | 2009-103577 A | 5/2009 |
| JP | 2009-229178 A | 10/2009 |
| JP | 2010-281579 A | 12/2010 |
| JP | 2011-47950 A | 3/2011 |
| JP | 2011-215106 A | 10/2011 |

OTHER PUBLICATIONS

Supplementary European Search Report issued Aug. 14, 2015 in Patent Application No. 13 75 7926.
International Preliminary Report on Patentability and Written Opinion issued Sep. 9, 2014 in PCT/JP2013/055278 filed Feb. 28, 2013 (with English language translation of Written Opinion).
Office Action issued Jan. 8, 2016 in Chinese Patent Application No. 201380008328.1 (with English language translation).
Notification of Reason(s) for Refusal issued Dec. 22, 2015 in Japanese Patent Application No. 2012-048938 (with English language translation).
Office Action issued Sep. 5, 2016 to Chinese Patent Application No. 2016063103207790, with English translation.

* cited by examiner

POSITIONING SYSTEM, TERMINAL DEVICE, RECORDING MEDIUM, AND POSITIONING METHOD

TECHNICAL FIELD

The present invention relates to a technique for calibrating a detection device in a positioning technique for identifying a position.

BACKGROUND ART

Applications have been known which provide navigation to a user from the user's closest station to a shop, for example. Patent Literature 1 describes a system for, by means of a portable information device including a contactless IC card therein, acquiring entry information from the contactless IC card and providing a route, when the portable information device has passed through a ticket gate, for example. However, the technique described in Patent Literature 1 is a technique for providing information on train transfer based on the entry information, not providing directions such as a user's travelling direction.

As a positioning technique for positioning a user who is moving in real time and providing directions to the user, GPS (Global Positioning System) using a satellite is generally used. However, GPS has a problem that a GPS terminal cannot receive radio waves from the GPS satellite indoors, e.g., in a terminal building or an underground mall, so that it cannot perform positioning for navigation in such environments.

Thus, relative positioning has been proposed as a technique for enabling indoor navigation, which uses a self-contained sensor (such as an acceleration sensor, an angular velocity sensor, or a magnetic sensor). The positioning by the self-contained sensor detects a user's motion (movement variable) with the self-contained sensor and estimates a traveling direction and a traveling speed to measure a movement vector of the user, for example. However, only a relative position can be obtained by the relative positioning, and therefore there is a problem that navigation cannot start before an absolute position is acquired.

Moreover, in the relative positioning, the absolute position cannot be obtained, unless an absolute orientation is identified and the user's moving direction (traveling direction) is determined. Thus, a magnetic sensor is generally used as the self-contained sensor so that the absolute orientation is identified by detecting terrestrial magnetism at a start of the navigation. Especially within the doors, however, there is a problem that a magnetic field is disturbed by an electronic device, building structures, or the like in many cases, and a precise position identification is difficult because of difficulty in precise detection of weak terrestrial magnetism. For overcoming this problem, a technique for acquiring a highly-reliable orientation by a magnetic sensor is described in Patent Literatures 2 to 4, for example.

Patent Literature 1: JP 2002-298169 A
Patent Literature 2: JP 2007-309803 A
Patent Literature 3: JP 2011-047950 A
Patent Literature 4: JP 3837533 B

SUMMARY OF INVENTION

Problems to be Solved by the Invention

The technique described in Patent Literatures 2 to 4 is a technique for acquiring an orientation by verifying the probability of the value of the magnetic sensor, and in a case where the value of the magnetic sensor continues to be uncertain, continues to estimate the orientation by a gyro sensor. Therefore, there is a problem that how to determine the traveling direction at the start of navigation is still unsolved.

Means for Solving the Problems

In order to solve the above problems, the invention of claim 1 includes an index element having a known absolute position, and a guide member provided to correspond to the index element and regulate a traveling direction of the user to be a reference direction. The terminal device includes: an acquisition element configured to acquire individual information of the index element; an absolute-position identification element configured to identify an absolute position of the user by acquiring the absolute position of the index element in accordance with the individual information acquired by the acquisition element; an acceleration detection element configured to detect an acceleration when the terminal device is moved; an angular-velocity detection element configured to detect an angular velocity when the terminal device is moved; a calibration element configured to calibrate the acceleration detection element and the angular-velocity detection element in accordance with detection results of the acceleration detection element and the angular-velocity detection element when the terminal device is substantially stationary; and an orientation identification element configured to identify an orientation in accordance with detection results output from the acceleration detection element and the angular-velocity detection element when the guide member regulates the traveling direction of the user to be the reference direction.

The invention according to claim 2 is the positioning system according to claim 1 wherein the index element includes a contactless IC card reader, the terminal device includes a contactless IC card portion, and the contactless IC card portion and the contactless IC card reader can perform data communication with each other.

The invention according to claim 3 is the positioning system according to claim 2, wherein the calibration element determines that the terminal device is substantially stationary around a period during which the contactless IC card portion and the contactless IC card reader performs data communication with each other.

The invention according to claim 4 is the positioning system according to claim 3, wherein the calibration element determines that the terminal device is substantially stationary around the period during which the contactless IC card portion and the contactless IC card reader performs data communication with each other in a case where a change amount is a threshold value or less in the detection result output from the acceleration detection element.

The invention according to claim 5 is the positioning system according to claim 1, wherein the index element is a ticket gate, the guide member is a housing of the ticket gate, and the calibration element determines that the terminal device is substantially stationary when the user is performing an entry operation or an exit operation for the ticket gate by the terminal device.

The invention according to claim 6 is the positioning system according to claim 5, wherein the acquisition element acquires individual information of the ticket gate therefrom when the user is performing the entry operation or the exit operation for the ticket gate by the terminal device.

The invention according to claim 7 is the positioning system according to claim 1, wherein the index element is a cash register terminal device, the guide member is a cash desk on which the cash register terminal device is placed, and the calibration element determines that the terminal device is substantially stationary when the user is making a payment operation for the cash register terminal device by the terminal device.

The invention according to claim 8 is the positioning system according to claim 7, wherein the acquisition element acquires individual information of the cash register terminal device from the cash register terminal device when the user is making the payment operation for the cash register terminal device by the terminal device.

The invention according to claim 9 is the positioning system according to claim 1, further comprising a server device which can perform data communication with the terminal device through a network. The server device includes a storage element configured to store the individual information of the index element, the absolute position of the index element, and the reference direction of the guide member corresponding to the index element such that those are associated with one another. The terminal device transmits the individual information of the index element acquired by the acquisition element to the server device. In accordance with the individual information of the index element transmitted from the terminal device, the server device transmits the absolute position of the index position and the reference direction of the guide member corresponding to the index element, that are stored in the storage element, to the terminal device.

The invention according to claim 10 is the positioning system according to claim 1, wherein the terminal device includes a storage element configured to store the individual information of the index element, the absolute position of the index element, and the reference direction of the guide member corresponding to the index element such that those are associated with one another. The absolute-position identification element acquires the absolute position of the index element stored in the storage element in accordance with individual information of the index element acquired by the acquisition element. The orientation identification element acquires the reference direction of the guide member corresponding to the index element stored in the storage element, in accordance with the individual information of the index element acquired by the acquisition element.

The invention according to claim 11 is the positioning system according to claim 1, wherein individual information includes the absolute position of the index element and the reference direction of the guide member corresponding to the index element.

The invention according to claim 12 is the positioning system according to claim 1, wherein the terminal device further includes a magnetism detection element configured to detect terrestrial magnetism.

The invention according to claim 13 is a terminal device to be carried by a user, including: an acquisition element configured to acquire individual information of an index element which is arranged outside and has a known absolute position; an absolute-position identification element configured to identify an absolute position of the user by acquiring the absolute position of the index element in accordance with the individual information acquired by the acquisition element; an acceleration detection element configured to detect an acceleration when the terminal device is moved; an angular-velocity detection element configured to detect an angular velocity when the terminal device is moved; a calibration element configured to calibrate the acceleration detection element and the angular-velocity detection element in accordance with detection results of the acceleration detection element and the angular-velocity detection element when the terminal device is substantially stationary; and an orientation identification element configured to identify an orientation, in accordance with detection results output from the acceleration detection element and the angular-velocity detection element when the guide member arranged outside to correspond to the index element regulates a traveling direction of the user to be a reference direction.

The invention according to claim 14 is a recording medium storing a program implementable by a computer carried by a user therein, the program instructing the computer to implement: acquiring individual information of an index element which is arranged outside and has a known absolute position; identifying an absolute position of the user by acquiring the absolute position of the index element in accordance with the acquired individual information; detecting an acceleration by an acceleration detection element when the computer is moved; detecting an angular velocity by an angular-velocity detection element when the computer is moved; calibrating the acceleration detection element and the angular-velocity detection element in accordance with detection results of the acceleration detection element and the angular-velocity detection element when the computer is substantially stationary; and identifying an orientation in accordance with detection results output from the acceleration detection element and the angular-velocity detection element when a guide member arranged outside to correspond to the index element regulates a traveling direction of the user to be a reference direction.

The invention according to claim 15 includes: acquiring individual information of an index element having a known absolute position; identifying an absolute position of the user carrying a terminal device by acquiring the absolute position of the index element in accordance with the acquired individual information; detecting an acceleration by an acceleration detection element when the terminal device is moved; detecting an angular velocity by an angular-velocity detection element when the terminal device is moved; calibrating the acceleration detection element and the angular-velocity detection element in accordance with detection results of the acceleration detection element and the angular-velocity detection element when the acceleration detection element and the angular-velocity detection element carried by the user is substantially stationary; and identifying an orientation in accordance with detection results output from the acceleration detection element and the angular-velocity detection element when a guide member arranged to correspond to the index element regulates a traveling direction of the user to be a reference direction.

Advantageous Effects of Invention

The inventions according to claims 1 to 15 identify an absolute position of a user by acquiring an absolute position of an index element in accordance with individual information; calibrate an acceleration detection element and an angular-velocity detection element in accordance with detection results of the acceleration detection element and the angular-velocity detection element when a terminal device is substantially stationary; and identify an orientation in accordance with detection results output from the acceleration detection element and the angular-velocity detection element when a guide member regulates a traveling direction of the user to be a reference direction. Thus, it is possible to acquire the absolute position of the user and the orientation without relying on GPS or a magnetic sensor.

DESCRIPTION OF REFERENCE SIGNS

Figure 1:
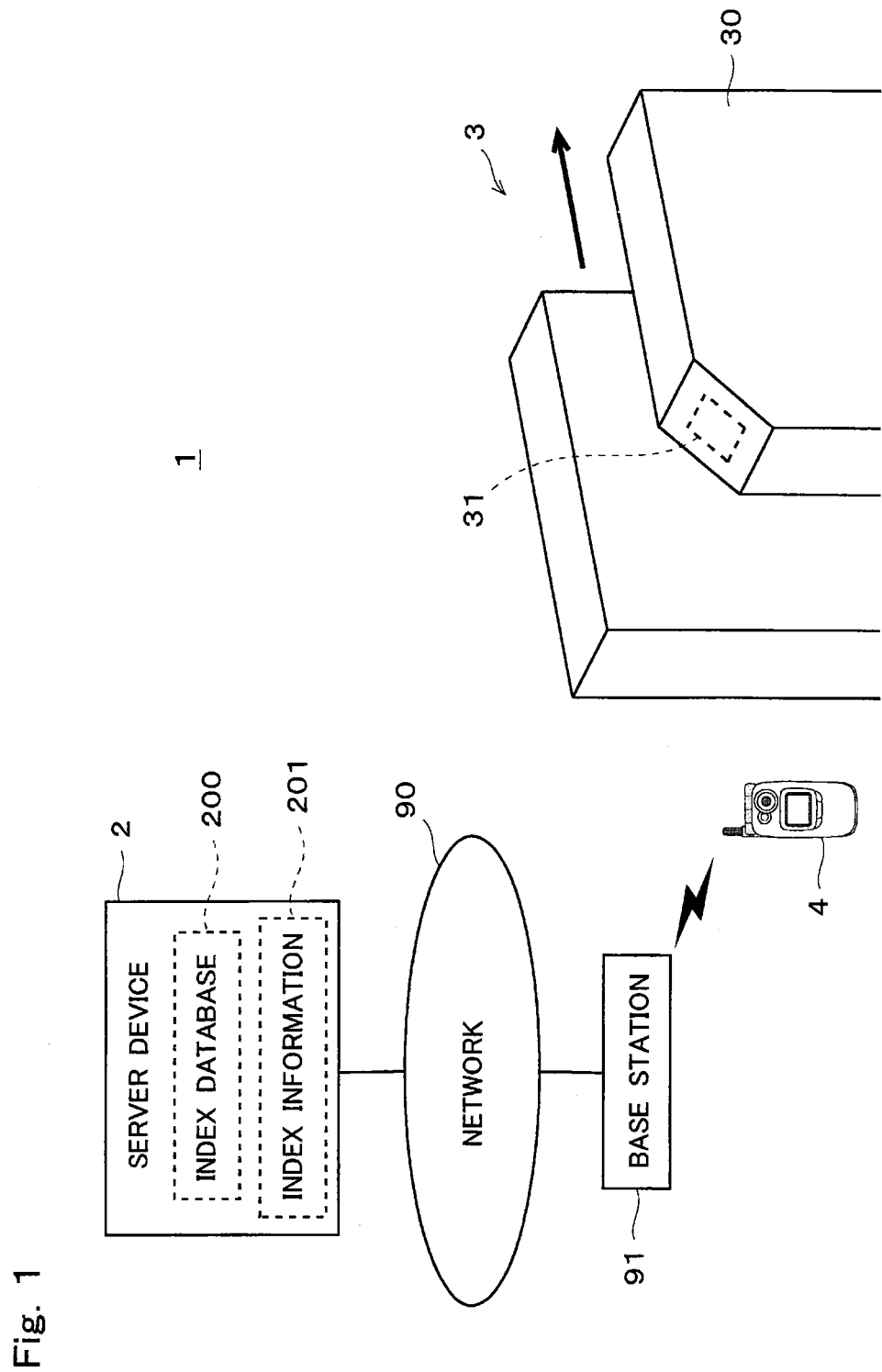
FIG. 1 is a diagram showing a positioning system in a preferred embodiment of the present invention.

1, 1a, 1b Positioning system
2 Server device
200, 400 Index database
201 Index information
3 Ticket gate
30 Housing
31, 51, 71 Contactless IC card reader
4, 4a, 4b Cell phone
40 Phone portion
401, 421 ROM
402, 422 RAM
403, 413, 423 Memory portion
404 Input portion
405 Output portion
406, 416 Communication portion
407, 417 Antenna
41 Contactless IC card portion
413 Memory portion
42 Sensor portion
425 Acceleration sensor
426 Angular velocity sensor
427 Magnetic sensor
429 Recording information
44, 47 CPU
440 Calibration instruction portion
450 Calibration information
451 Reference time
452 Absolute position
453 Reference direction
46 Card control portion
470 Calibration portion
471 Orientation identification portion
472 Moving amount calculation portion
473 Position identification portion
475 Acceleration information
476 Angular velocity information
477 Orientation information
478 Relative moving amount information
5 Cash register terminal device
6 Cash desk
7 Moving walkway
70 Communication device
72 Handrail member
80, 81 Program
800, 801 Individual information

BEST MODE FOR CARRYING OUT THE INVENTION

Hereinafter, preferred embodiments of the present invention are described in detail, referring to the accompanying drawings.

FIG. 1 is a diagram showing a positioning system 1 in a preferred embodiment of the present invention. The positioning system 1 includes a server device 2 installed in a service provider or the like, a ticket gate 3 installed in a gate in a station or the like, and a cell phone 4 as a terminal device which is carried by a user. The positioning system 1 is configured as a system which identifies and records the position (absolute position) of the user who carries the cell phone 4, and the details thereof will be described below.

As a service provided by identification of the absolute position of the user by the positioning system 1, a navigation service for guiding the user to a user's destination in real time can be considered. However, the service may be a service which simply lets a user know a current position of the user by indicating it on a map or a service which records a movement trajectory of the user. That is, it is not specifically limited which service is provided based on the absolute position of the user identified by the positioning system 1. Also, the numbers of the server devices 2, the ticket gates 3, and the cell phones 4 included in the positioning system 1 are not limited to those shown in FIG. 1. Furthermore, any communication network can be used as a network 90, as long as it enables data communication between the server device 2 and the cell phone 4.

The server device 2 is a generally used computer and is connected to the network 90. The server device 2 forms an index database 200 as shown in FIG. 1.

The index database 200 is a database having a table structure in which one record is created for each ticket gate 3 registered in the positioning system 1. In each record of the index database 200, identification information for identifying each ticket gate 3, an absolute position of a place at which that ticket gate 3 is installed, and a reference direction (described later) of that ticket gate 3 such that those are associated with one another. Please note that the information stored in the index database 200 is not limited thereto.

The index database 200 can allow the absolute direction of the ticket gate 3 and the reference direction to be searched with the identification information of the ticket gate 3 as a search key. Although the details will be later, in response to a search request from the cell phone 4, the server device 2 creates index information 201 and sends it to that cell phone 4. The index information 201 is information containing the absolute position and the reference direction. The absolute position and the reference direction contained in the index information 201 are information associated with the identification information contained in the search request sent from the cell phone 4, in the index database 200.

The ticket gate 3 is installed at a gate in a station or the like, and is configured to monitor entry or exit of a passenger or the like and perform fare collection as necessary, for example. The ticket gate 3 is usually fixed with respect to a horizon plane as a stationary device and, unlike the cell phone, does not change its position frequently. Since the absolute position of the ticket gate 3 is not changed as described above, the absolute position of the ticket gate 3 can be stored in the index database 200 in advance when that ticket gate 3 is registered into the positioning system 1.

The ticket gate 3 is provided with a housing 30 and a contactless IC (Integrated Circuit) card reader 31.

The housing 30 forms an approximately opposed wall-shaped member and defines a passage of a user (passenger) who passes through the ticket gate 3. When the user has passed through the passage defined by the housing 30 by walking, a traveling direction of the user is regulated to be a direction (reference direction) shown with bold arrow in FIG. 1. That is, the housing 30 is provided to correspond to the ticket gate 3 (index element) and acts as a guide member which regulates the traveling direction of the user to be the reference direction.

Since the ticket gate 3 is fixed as a stationary device as described above, it can be considered that not only the absolute position thereof but also the orientation thereof are not changed. Therefore, for a ticket gate 3 having a housing 30 which is installed in such a manner that a user goes north, for example, the reference direction thereof is registered as "north" in the index database 200. In this case, when a user is identified as a person who is being passing through that ticket gate 3, the traveling direction of that user can be identified as "north."

The contactless IC card reader 31 can perform close proximity wireless communication with a generally-used contactless IC card to read various kinds of information stored in that contactless IC cared and transmit various kinds of information to that contactless IC card. As the contactless IC cared reader 31, a conventional technique can be employed. Therefore, the details of the contactless IC cared reader 31 are omitted.

Please note that in a general ticket gate a passage formed by a housing thereof allows a user to pass therethrough bidirectionally. However, the thus configured ticket gate is usually provided with a contactless IC card reader used at entry and a contactless IC cared reader used at exit which are separate from each other. Therefore, by assigning a different identifier to each of those contactless IC card readers and acquiring that identifier by means of the cell phone 4 during communication, the reference direction can be identified. Even in a type of ticket gate which uses a single contactless IC card reader at entry and exit, it is necessary to distinguish entry and exit from each other in entry/exit processing (processing related to entry and exit of a user), and therefore information which specifies entry or exit is always created. Therefore, in a case of such a ticket gate, it is also possible to identify the reference direction based on the information for distinguishing entry and exit from each other.

Figure 2:
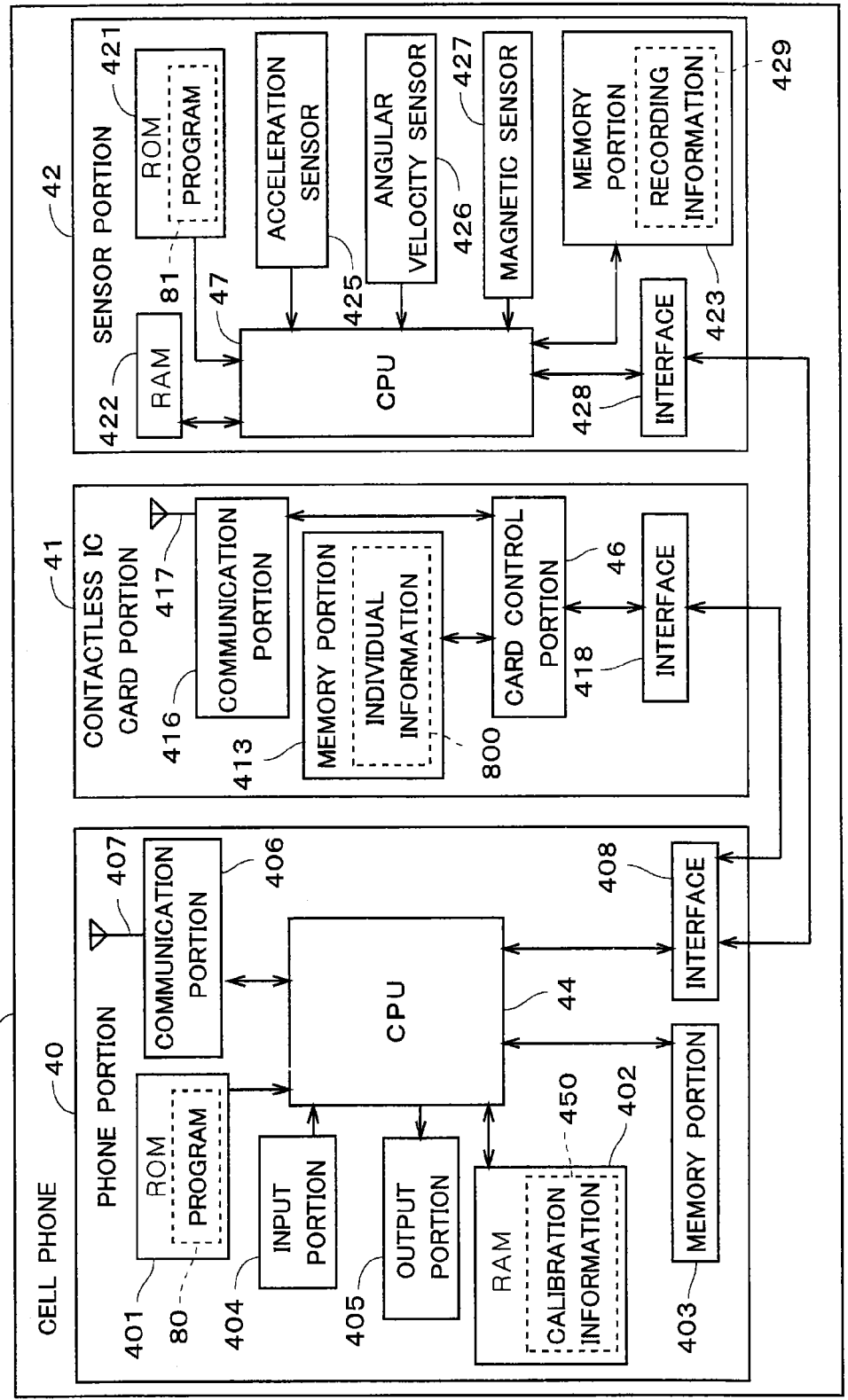
FIG. 2 is a diagram showing a cell phone in the preferred embodiment of the present invention.

FIG. 2 shows the cell phone 4 in the preferred embodiment. The cell phone 4 includes a phone portion 40, a contactless IC card portion 41, and a sensor portion 42.

The phone portion 40 includes a CPU 44, a ROM 401, a RAM 402, a memory portion 403, an input portion 404, and an output portion 405 and has a structure and functions as a general computer.

The CPU 44 operates in accordance with a program 80 stored in the ROM 401, thereby controlling respective components provided in the phone portion 40. The details of the functions and the operation of the CPU 44 will be described later.

The ROM 401 is a read-only memory device used for storing the program 80 mainly. The program 80 stored in the ROM 401 is sequentially read out and executed by the CPU 44. The program 80 may be stored in the memory portion 403 described later partly or entirely.

The RAM 402 is a volatile memory device which allows relatively high-speed access, and is used as a temporal working area of the CPU 44. In the following, the description will be made assuming that various kinds of information created or acquired in the phone portion 40 is stored in the RAM 402 unless otherwise specified. However those kinds of information stored in the RAM 402 may be partly or entirely transferred to the memory portion 403 and stored in the memory portion 403 as appropriate.

The memory portion 403 is a non-volatile memory device which allows both reading and writing of information by the CPU 44. Exemplary memory portions 403 include not only a fixed-type memory device which is to be incorporated but also a removable memory device (e.g., memory card).

The input portion 404 has a function of inputting various kinds of information to the cell phone 4. Exemplary input portions 404 include a microphone for inputting ambient sounds, a dial, keys, and/buttons for inputting character information and the like, a touch panel as a pointing device, and a digital camera for taking in image information by capturing it, for example.

The output portion 405 has a function of outputting various kinds of information, thereby presenting the information mainly to a user. Exemplary output portions 405 are a speaker which reproduces a party's voice in speech, melody and the like, a liquid crystal display panel which displays an image and/or characters on a screen, an LED or a lamp which indicates various statuses, and a vibrator which indicates a status by generating vibrations.

The phone portion 40 includes a communication portion 406, an antenna 407, and an interface 408.

The communication portion 406 demodulates an analog signal input from the antenna 407 to a digital signal and transmits that digital signal to the CPU 44. The communication portion 406 also modulates a digital signal input from the CPU 44 to an analog signal, transmits that analog signal to the antenna 407, and controls the antenna 407 to send the analog signal toward a base station 91.

The antenna 407 receives radio waves sent from the base station 91, converts those to an analog signal, and transmits it to the communication portion 406. The antenna 407 also has a function of converting an analog signal input from the communication portion 406 to radio waves and sending the radio waves toward the base station 91.

In this manner, by the communication portion 406 and the antenna 407, a data communication function and a voice communication function via the network 90 are realized in the cell phone 4. In this embodiment, individual information 800 described later is mainly sent to the server device 2 by the communication portion 406 and the antenna 407 as the aforementioned search request. Also, in response to the search request containing that individual information 800, index information 201 sent from the server device 2 is received by the communication portion 406 and the antenna 407. The network address of the server device 2 and the like are stored in the ROM 401 or the memory portion 403 in advance.

The interface 408 provides a function of data communication by the CPU 44 of the phone portion 40 with a card controller portion 46 described later and a CPU 47. The interface 408 may include terminals for connecting the cell phone 4 to an external device or the like. Those terminals are a USB terminal, an earphone jack terminal, and a power supply (charging) terminal, for example.

The phone portion 40 includes a timer (clock) in addition to the above structure and is configured to be able to measure time, although it is not shown.

The contactless IC card portion 41 includes a card controller portion 46, a memory portion 413, a communication portion 416, an antenna 417, and an interface 418.

The card controller portion 46 includes a CPU for calculating various kinds of information and a ROM and RAM as memory devices, although they are not shown. That is, the card controller portion 46 has a structure and functions as a computer. In particular, the card controller portion 46 performs entry and exit processing between the card controller portion 46 and the contactless IC card reader 31 and has a function of transferring the individual information 800 to the phone portion 40.

The memory portion 413 is a memory device which allows information to be read out therefrom and written thereinto by the card controller portion 46. Especially, the memory portion 413 in the preferred embodiment stores individual information 800 which is transmitted from the contactless IC card reader 31 of the ticket gate 3 and is received by the communication portion 416 therein. The memory portion 413 also has a function of storing other information received from the contactless IC card reader 31 of the ticket gate 3 and various kinds of information created by the card controller portion 46 in accordance with the entry and exit processing.

The communication portion 416 demodulates an analog signal input from the antenna 417 to a digital signal and transmits that digital signal to the card controller portion 46. The communication portion 416 also modulates a digital signal input from the card controller portion 46 to an analog signal, transmits that analog signal to the antenna 417, and controls the antenna 417 to send it to the contactless IC card reader 31 of the ticket gate 3.

The antenna 417 is an antenna for close proximity wireless communication. The antenna 417 receives radio waves sent from the contactless IC card reader 31, and converts them into an analog signal and transmits it to the communication portion 416. The antenna 417 also has a function of converting an analog signal input from the communication portion 416 to radio waves and transmitting them to the contactless IC card reader 31.

As described above, the contactless IC card portion 41 has a structure and functions of a general contactless IC card and is configured to be able to perform wireless communication with the contactless IC card reader 31 of the ticket gate 3. Therefore, a user can make entry and exit processing for that user be performed and can acquire at least individual information 800 onto the contactless IC card portion 41 side, by bringing the cell phone 4 close to the contactless IC card reader 31 of the ticket gate 3 and passing it over the contactless IC card reader 31. In the following description, a series of operations in which the user brings the cell phone 4 close to the contactless IC card reader 31 and passes it thereover is referred to as a "communication enabling operation."

The ticket gate 3 includes a gate member which is not shown and is designed such that the gate member is not opened for a user for whom entry and exit processing has not been done, although the details are omitted. Therefore, a user who wants to pass thorough the ticket gate 3 and enter to or leave from the ticket gate 3 has to complete entry and exit processing for opening the gate member. In order to do that, first the user has to perform the communication enabling operation. In general, however, it is widely known to users that the communication enabling operation has to be performed for the ticket gate 3, and it is not necessary to let the users know that again. Moreover, even if the positioning system 1 requests a user to perform the communication enabling operation, it does not mean that the system 1 requests a new operation to the user, and therefore a user's burden is not increased.

The antenna 417 of the contactless IC card portion 41 is an antenna for close proximity wireless communication as described above. Therefore, the contactless IC card portion 41 of the cell phone 4 cannot perform data communication with the ticket gate 3 unless it comes close to the ticket gate 3. In other words, if the contactless IC card portion 41 is in a state in which it can perform data communication with the ticket gate 3, the cell phone 4 can be regarded as existing near the ticket gate 3. In that case, therefore, it is meant that the absolute position of the cell phone 4 (the absolute position of the user who carries that cell phone 4) can be regarded as the absolute position of the ticket gate 3. Thus, the positioning system 1 in this embodiment makes the ticket gate 3 send identification information for individually identifying ticket gates 3 as individual information 800 to the cell phone 4. Then, the cell phone 4 which has acquired the identification information the ticket gate 3 makes an access to the index database 200 by using the acquired identification information as a search key, to obtain the absolute position and the reference direction of the ticket gate 3.

Entry and exit processing by ticket gates installed at stations (including the ticket gate 3) is processing required mainly for deduction of fare. For fare deduction, at least information for identifying a station of entry (boarding station) and a station of exit (exit station) is required. Therefore, in order for the ticket gate to perform the entry and exit processing, information for specifying somewhere has to be sent to the cell phone 4.

However, for the purpose of fare payment, it is enough that the boarding station and the exit station are identified, and if only the entry and exit processing is considered, it is enough for the ticket gate to send a station name (station identification information) to the cell phone 4 (the contactless IC card portion 41) side. Therefore, in a case where a ticket gate which has been already installed at a station is used in the positioning system 1, it can be expected that that ticket gate sends the station name only (or the station name and the ticket gate name only) as information identifying the place. In this case, individual information 800 is the station name only (or the station name and the ticket gate name only).

On the other hand, in gates which can be often seen, a plurality of ticket gates are installed while being arranged approximately parallel to each other. In this case, the reference directions of the respective ticket gates can be regarded as being identical to one another. Moreover, in some navigation services, a large error is not caused even if the absolute positions of the ticket gates installed at the same gate are regarded as being identical. Furthermore, for a station having only one gate, the absolute position and the reference direction can be approximately identified if that station can be specified. In other words, even in a case where individual ticket gate cannot be identified, by registering the absolute position and the reference direction in the index database 200 with the station or the gate as a search key, it can be expected that individual information 800 including only the station name (or the station name and the gate only) also provides a certain degree of advantages.

In addition, the station name and/or the gate name (information for specifying the station and/or the gate) is more widely-recognized information, as compared with identification information for individually identifying the ticket gate. Therefore, a method for acquiring the station name and/or the gate name is not limited to a method which receives the station name and/or the gate name as individual information 800 from the ticket gate. For example, a user may input those by operating the input portion 404, or may specify those through a map image displayed on the output portion 405. Alternatively, based on a route search result which has been input in advance, the station name and/or the gate name on the route may be identified.

The interface 418 provides a function that the card controller portion 46 performs data communication mainly with the CPU 44 of the phone portion 40. Especially, the interface 418 in this embodiment outputs individual information 800 acquired from the ticket gate 3 (contactless IC card reader 31) to the CPU 44.

The sensor portion 42 includes a CPU 47, a ROM 421, a RAM 422, a memory portion 423, an acceleration sensor 425, an angular velocity sensor 426, a magnetic sensor 427, and an interface 428.

The CPU 47 operates in accordance with a program 81 stored in the ROM 421, thereby controlling the respective components of the sensor portion 42. The details of the functions and operations of the CPU 47 will be described later.

The ROM 421 is a read only storage device mainly used for storing the program 81. The program 81 stored in the ROM 421 is sequentially read out and executed by the CPU 47. The program 81 may be partly or entirely stored in the memory portion 423 described later.

The RAM 422 is a volatile storage device which allows a relatively high-speed access thereto, and is used as a temporary working area of the CPU 47. Please note that the following description is made assuming that various kinds of information created or acquired in the sensor portion 42 is stored in the RAM 422, unless otherwise mentioned. However, the information stored in the RAM 422 may be partly or entirely transferred to and stored in the memory portion 423 as appropriate.

In that manner, the sensor portion 42 includes the CPU 47, the ROM 421, and the RAM 422, thereby having the structure and functions as a general computer.

The memory portion 423 is a storage device which allows both reading out of information by the CPU 47 and writing of information by the CPU 47. Especially, the memory portion 423 in the preferred embodiment stores output values of the acceleration sensor 425, the angular velocity sensor 426, and the magnetic sensor 427 as appropriate and stores a result of user's movement as record information 429.

The acceleration sensor 425 is a detection device which detects an acceleration vector of the cell phone 4.

The angular velocity sensor 426 is a detection device which detects an angular velocity vector of the cell phone 4.

The magnetic sensor 427 is a detection device which detects a direction of terrestrial magnetism and identifies an orientation.

The interface 428 provides a function that the CPU 47 performs data communication mainly with the CPU 44 of the phone portion 44. Especially, the interface 428 in this embodiment receives calibration information 450 generated in the phone portion 40 via the interface 408.

Figure 3:
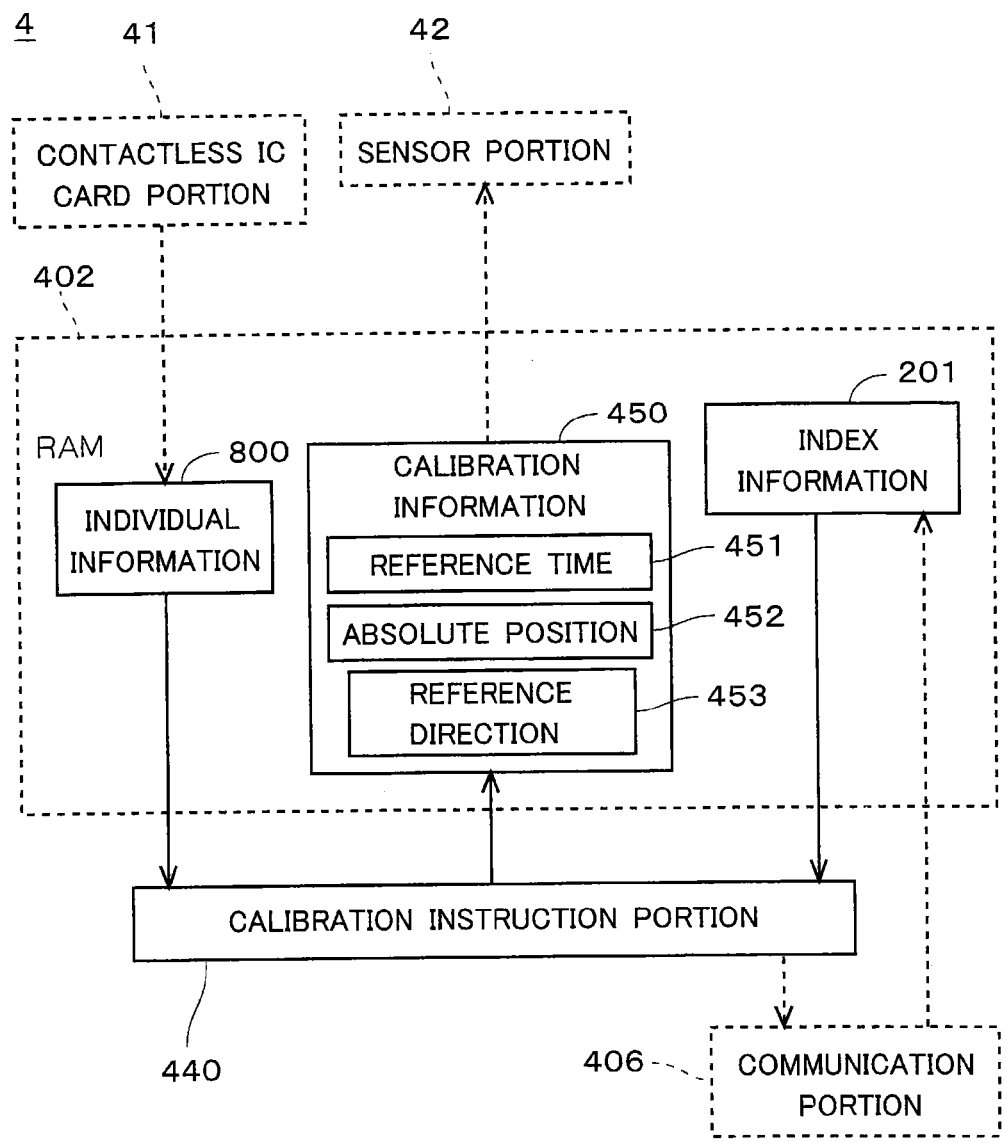
FIG. 3 is a diagram showing functional blocks provided in a phone portion in the preferred embodiment of the present invention, with a data flow.

FIG. 3 is a diagram showing functional blocks provided in the phone portion 40 in the preferred embodiment, together with a data flow. A calibration instruction portion 440 shown in FIG. 3 is a functional block implemented by an operation of the CPU 44 in accordance with the program 80.

When individual information 800 is acquired from the contactless IC card portion 41, the calibration instruction portion 440 refers to a timer which is not shown, records a time at which that individual information 800 is acquired (hereinafter, referred to as a "reference time 451"), and notifies the sensor portion 42 of a calibration timing.

Also, the calibration instruction portion 440 generates a search request containing the individual information 800 acquired from the contactless IC card portion 41 in parallel with the processing for calibration timing notification, and controls the communication portion 406 to send the search request to the server device 2.

Moreover, the calibration instruction device 440 acquires an absolute position from index information 201 which has been transmitted from the server device 2 in response to the search request and received by the communication portion 406, as an absolute position 452. As described before, the absolute position contained in the index information 201 is the absolute position of the ticket gate 3 specified by the individual information 800 contained in the search request.

The calibration instruction portion 440 also acquires from the index information 201 the reference direction of the ticket gate 3 contained in the index information 201 obtained from the server device 2, as a reference direction 453.

Furthermore, the calibration instruction portion 440 generates calibration information 450 based on the reference time 451, the absolute position 452, and the reference direction 453. The generated calibration information 450 is transferred to the sensor portion 42 via the interface 408.

Figure 4:
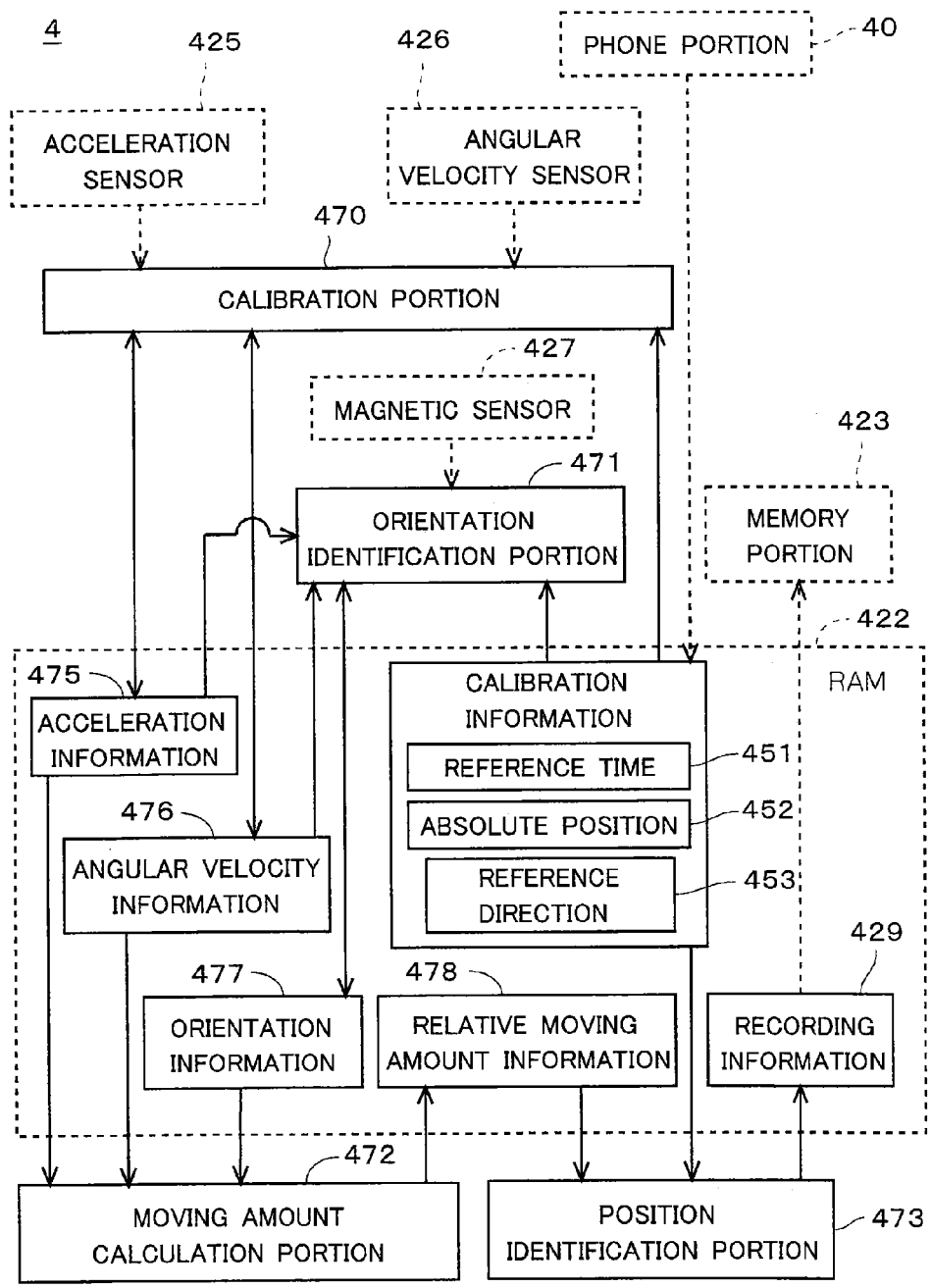
FIG. 4 is a diagram showing functional blocks provided in a sensor portion in the preferred embodiment of the present invention, with a data flow.

FIG. 4 is a diagram showing functional blocks provided in the sensor portion 42 in the preferred embodiment, together with a data flow. A calibration portion 470, an orientation identification portion 471, a moving amount calculation portion 472, and a position identification portion 473 shown in FIG. 4 are functional blocks implemented by operations of the CPU 47 by the program 81.

In accordance with a measured value (detection result) of the acceleration sensor 425 at a time at which the calibration timing is notified by the phone portion 40, the calibration portion 470 calibrates the measured value of the acceleration sensor 425 and generates acceleration information 475.

By receiving the individual information 800, the card controller portion 46 of the contactless IC card portion 41 in this embodiment transmits it to the phone portion 40 immediately when acquiring the individual information 800. The CPU 44 (calibration instruction portion 440) of the phone portion 40 notifies the sensor portion 42 of the calibration timing immediately when the individual information 800 has been transmitted from the contactless IC card portion 41. Therefore, a time at which the calibration timing has been notified can be almost regarded as a time at which the individual information 800 has been acquired in the cell phone 4.

In this embodiment, the time at which the cell phone 4 has acquired the individual information 800 is a time at which the user is performing the communication enabling operation by the cell phone 4. When the user is performing the communication enabling operation, it can be estimated that the cell phone 4 is placed in a state that can be regarded as a stationary state.

Strictly, communication between the ticket gate 3 and the cell phone 4 is possible even when the cell phone 4 is not stationary. Therefore, at a moment at which the individual information 800 has been acquired, the cell phone 4 is not always stationary. Thus, the calibration portion 470 monitors a timing at which, before and after the calibration timing has been notified, a change amount of the measured value of the acceleration sensor 425 is equal to or smaller than a threshold value. When that change amount becomes the threshold value or less, it is estimated that the cell phone 4 is placed in the stationary state. Due to this configuration, the stationary state of the cell phone 4 can be precisely detected and therefore an error can be suppressed. Moreover, by detection of the stationary state of the cell phone 4 in the communication enabling operation, it is possible to calibrate the acceleration sensor 425 and the angular velocity sensor 426 without requesting a separate operation for placing the cell phone 4 in the stationary state to the user.

In the stationary state, the acceleration sensor 425 detects a gravity acceleration vector only. Therefore, following Equation 1 is satisfied.

[Equation 1]

$$G_s = \frac{g}{\sqrt{a_x^2 + a_y^2 + a_z^2}} \quad \text{(Equation 1)}$$

Gs: sensor gain
g: gravity acceleration
$a_x$: measured value component in x-direction of sensor coordinate system
$a_y$: measured value component in y-direction of sensor coordinate system
$a_z$: measured value component in z-direction of sensor coordinate system Therefore, when gain Gs of the acceleration sensor 452 is obtained from Equation 1, a subsequent acceleration vector (calibrated acceleration vector) is determined by Equation 2.

Acceleration=Sensor output×Gs  (Equation 2)

In this manner, in accordance with the measured value (detection result) of the acceleration sensor 425 at the time at which the calibration timing has been notified from the phone portion 40, the calibration portion 470 calibrates the measured value of that acceleration sensor 425. That is, the calibration portion 470 calibrates the acceleration sensor 425 in accordance with the detection result of the acceleration sensor 425 at the time at which the individual information 800 has been acquired.

Also, in accordance with a measured value (detection result) of the angular velocity sensor 426 at the time of the notification of the calibration timing from the phone portion 40, the calibration portion 470 calibrates the measured value of the angular velocity sensor 426 and generates angular velocity information 476.

The calibration portion 470 obtains an angular velocity from following Equation 3, using the measured value of the angular velocity sensor 426 in the stationary state as an offset value.

[Equation 3]

Angular velocity=Sensor output−Offset value  (Equation 3)

That is, in accordance with the measured value (detection result) of the angular velocity sensor 426 at the time of notification of the calibration timing from the phone portion 40, the calibration portion 470 calibrates the measured value of that angular velocity sensor 426. In other words, the calibration portion 470 has a function of calibrating the angular velocity sensor 426 in accordance with the detection result of the angular velocity sensor 426 at the time at which the individual information 800 has been acquired.

The calibration portion 470 can read out the acceleration information 475 and the angular velocity information 476 that were generated before and calibrate those retrospectively.

The orientation identification portion 471 calibrates a measured value of the magnetic sensor 427 based on the calibration information 450 and generates orientation information 477.

The orientation identification portion 471 analyzes the acceleration information 475 and the angular velocity information 476 after the reference time 451 and detects a walking operation of the user. Then, regarding the detected user's walking operation as movement of the user when the moving direction is regulated to be the reference direction by the housing 30 of the ticket gate 3, the orientation identification portion 471 calibrates the orientation information 477 so that the direction of the walking operation (user's traveling direction) is the reference direction.

The orientation identification portion 471 can also read out the orientation direction 477 generated before and calibrate it retrospectively.

To a method for detecting the use's walking operation based on the acceleration information 475 that is the measured value of the acceleration sensor 425 and the angular velocity information 476 that is the angular velocity sensor 426, a conventional technique can be applied. Therefore, the details are not described here.

The moving amount calculation portion 472 calculates a relative moving amount of the cell phone 4 (user) based on the acceleration information 475, the angular velocity information 476, and the orientation information 477, and generates relative moving amount information 478. To a method for generating the relative moving amount information 478 by the moving amount calculation portion 472, a conventional technique can be applied. Therefore, the details are omitted here.

The position identification portion 473 regards the absolute position 452 contained in the calibration information 450 as a user's absolute position at the reference time 451. Then, the position identification portion 473 identifies the user's absolute positions before and after the reference time 451 from the relative moving amount (relative moving amount information 478) from the absolute position 452 at the reference time 451, and generates record information 429.

The absolute position 452 contained in the calibration information 450 is the absolute position of the ticket gate 3 which has transmitted the individual information 800. When the individual information 800 is received, the user is supposed to perform the communication enabling operation with the cell phone 4 and that cell phone 4 is close to the contactless IC card reader 31 of that ticket gate 3. Therefore, the absolute position of the ticket gate 3 which has transmitted the individual information 800 can be regarded as the absolute position of the cell phone 4 at the time (reference time 451) at which the cell phone 4 has received the individual information 800 from that ticket gate 3. Also, at that time at which the individual information 800 is received, the user is performing the communication enabling operation. Therefore, it can be considered that that user carries the cell phone 4 and the absolute position of the cell phone 4 is the absolute position of the user at that time. In other words, the position identification portion 473 in the preferred embodiment has a function of identifying the absolute position of the user by acquiring the absolute position (absolute position 452) of the ticket gate 3 in accordance with the individual information 800 acquired by the contactless IC card portion 41.

It is preferable that the reference time 451 precisely indicate a timing at which the user is performing the communication enabling operation. Therefore, the timer may be provided in the contactless IC card portion 41 so that the reference time 451 is recorded as the time at which the individual information 800 is received in the contactless IC card portion 41 and is transmitted to the phone portion 40 together with the individual information 800. Alternatively, if the timer of the ticket gate 3 and the timer of the cell phone 4 are coincident with each other, the time transmitted from the ticket gate 3 (a usual ticket gate makes a time at which a passenger has passed through the gate be recorded on the IC card side) as the entry/exit time may be used as the reference time 451. In this case, it is unnecessary for the contactless IC card portion 41 to include the timer.

The above is the description of the structure and functions of the positioning system 1 in the preferred embodiment. Next, a positioning method in the preferred embodiment which measures an absolute position of a user with the positioning system 1 is described.

Figure 5:
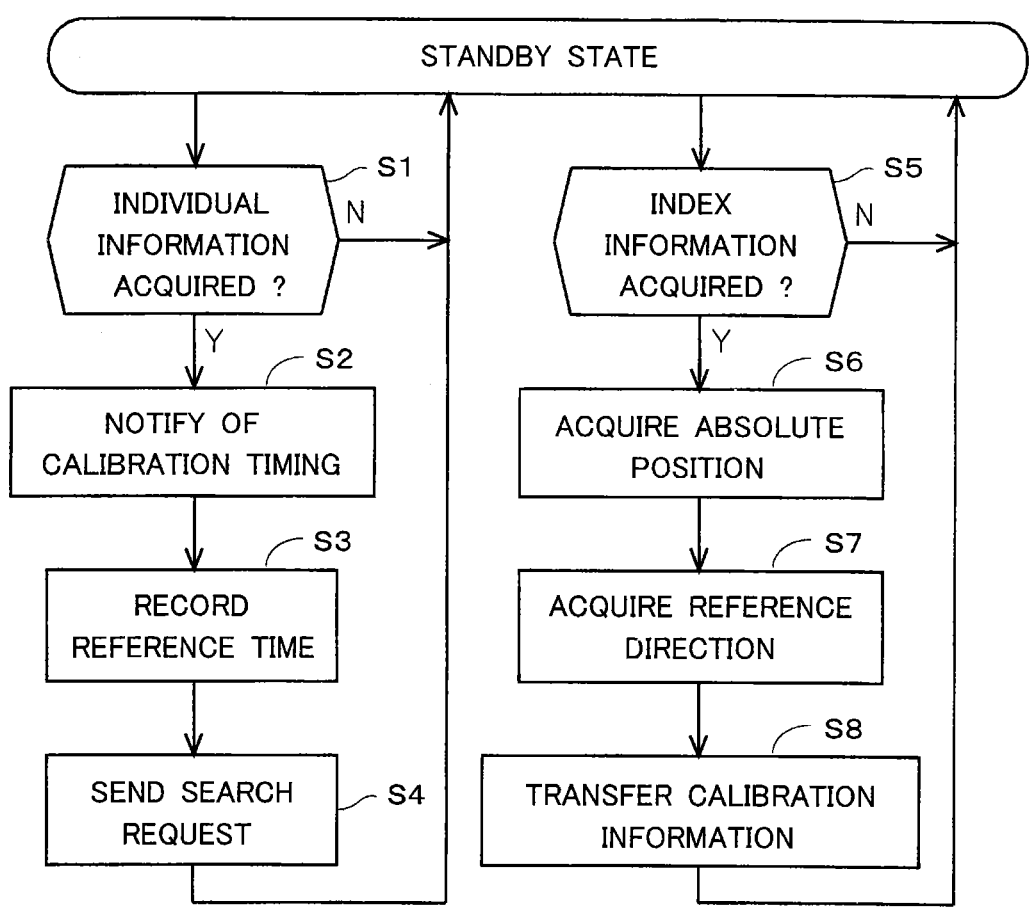
FIG. 5 is a flowchart showing an operation of the phone portion in the preferred embodiment of the present invention.

FIG. 5 is a flowchart showing an operation of the phone portion 40 in the preferred embodiment. It is assumed that before respective processes shown in FIG. 5 start, the cell phone 4 is turned on and is placed on a standby state.

In the standby state, the CPU 44 of the phone portion 40 monitors whether individual information 800 is transmitted from the contactless IC card portion 41 or the communication portion 406 receives index information 201 (Steps S1 and S5). In the standby state, the CPU 44 also monitors other states than that shown in FIG. 5, e.g., a dial instruction or an internet browsing instruction by the user. Please note that the standby state in this embodiment does not mean a state where conversation, internet browsing, image capturing or the like by the cell phone 4 is not performed, but a state where the cell phone 4 is turned on and arrival of the individual information 800 and index information 201 can be monitored.

In the standby state, when individual information 800 has been transmitted from the contactless IC card portion 41 (Yes in Step S1), the CPU 44 notifies the sensor portion 42 that the individual information 800 has been transmitted from the contactless IC card portion 41, as a calibration timing (Step S2).

In parallel with the processing in Step S2, the calibration instruction portion 440 records the time at which the individual information 800 has been transmitted from the contactless IC card portion 41 as a reference time 451 so that the reference time 451 is included in the calibration information 450 (step S3).

Moreover, the calibration instruction portion 440 controls the communication portion 406 to send a search request containing the individual information 800 to the server device 2. Thus, the search request is sent to the server device 2 (Step S4). After executing Step S4, the phone portion 40 returns to the standby state.

Upon receiving the search request transmitted in Step S4, the server device 2 makes a search in the index database 200 using the individual information 800 contained in that search request (the identification information of the ticket gate 3 in this embodiment) as a search key. In this way, the absolute position of the ticket gate 3 specified by the individual information 800 and the reference direction of that ticket gate 3 are extracted and sent to the cell phone 4 as index information 201.

In the standby state, when the index information 201 has been acquired (Yes in Step S5), the calibration instruction portion 440 acquires the absolute position of the ticket gate 3 from the acquired index information 201 and makes it be the absolute position 452 (Step S6). The calibration instruction portion 440 also acquires the reference direction of the ticket gate 3 from the acquired index information 201 and makes it be the reference direction 453 (Step S7).

The reference time 451 recorded in Step S3, the absolute position 452 acquired in Step S6, and the reference direction 453 acquired in Step S7 are transmitted as calibration information 450 to the sensor portion 42 (Step S8). After executing Step S8, the phone portion 40 returns to the standby state again.

In this manner, the phone portion 40 performs a calibration instruction to the sensor portion 42 (notification of the calibration timing), recording of the reference time 451, acquisition of the absolute position and reference direction of the ticket gate 3, and notification of the calibration information 450 to the sensor portion 42, by regarding acquisition of the individual information 800 (transfer from the contactless IC card portion 41) as a trigger.

Next, it is described how to calibrate the sensors (the acceleration sensor 425, the angular velocity sensor 426, and the magnetic sensor 427) in the sensor portion 42.

Figure 6:
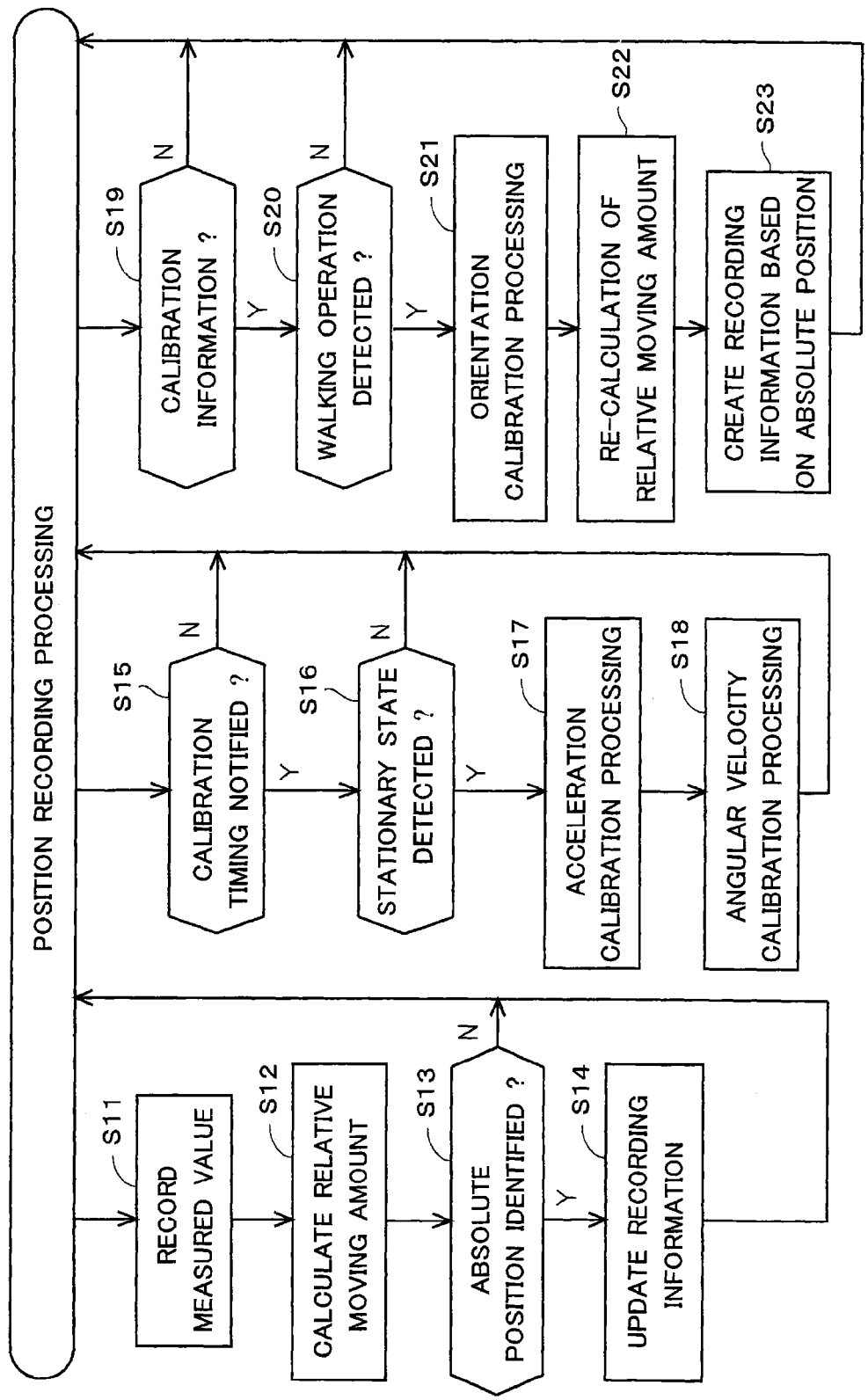
FIG. 6 is a diagram showing an operation of the sensor portion in the preferred embodiment of the present invention.

FIG. 6 is a diagram showing an operation of the sensor portion 42 in the preferred embodiment. In FIG. 6, position recording processing executed by the sensor portion 42 is shown. The position recording processing is processing for recording a position of a user (cell phone 4) in time series and has been started, for example, by a user's instruction before respective processes shown in FIG. 6 are started. Moreover, it is not specifically limited which service is provided after the user's position is acquired, as described above.

While the position recording processing is being performed, the sensor portion 42 performs recording of a measurement value (Step S11) and calculation of a relative moving amount (Step S12), and, if the absolute position has been already identified (Yes in Step S13), updates the record information 429 (Step S14).

In Step S11, the calibration portion 470 generates acceleration information 475 based on a measured value of the acceleration sensor 425 and generates angular velocity information 476 based on a measured value of the angular velocity sensor 426. Moreover, the orientation identification portion 471 generates orientation information 477 based on a measured value of the magnetic sensor 427. In other words, the measured values of the self-contained sensors are always updated by execution of Step S11.

In Step S12, the moving amount calculation portion 472 generates relative moving amount information 478, that is a result of relative movement of the user (cell phone 4), based on the acceleration information 475, the angular velocity information 476, and the orientation information 477.

In this manner, in the position recording processing, the CPU 47 performs recording of the measured values and recording of relative moving amount, and monitors notification of the calibration timing and transfer of the calibration information 450 (Steps S15 and S19).

In the position recording processing, when the calibration timing is notified from the phone portion 40, thereafter it is determined by the calibration portion 470 to be Yes in Step S15. Then, the calibration portion 470 is placed in a state in which it monitors a change amount of the measured value of the acceleration sensor 425 and determines whether or not the stationary state has been detected (Step S16). The determination in Step S16 is made based on whether or not the change amount of the measured value of that acceleration sensor 425 becomes a threshold value or less.

When it is determined to be stationary state (Yes in Step S16), the calibration portion 470 performs acceleration calibration processing (Step S17). In Step S17, the calibration portion 470 calculates Equation 1 based on a measured value of the acceleration sensor 425 when the cell phone 4 is determined to be in the stationary state and known gravity acceleration (g) to obtain the gain Gs of the acceleration sensor 425. Then, the calibration portion 470 reads out the past measured value of the acceleration sensor 425 (acceleration information 475), calibrates it by Equation 2, and updates it. Thus, the measured value already recorded is calibrated. Thereafter the calibration portion 470 calibrates the measured value in Step S11 by Equation 2 and records it.

In parallel with the processing in Step S17, the calibration portion 470 performs angular velocity calibration processing (Step S18). In Step S18, the calibration portion 470 makes a measured value of the angular velocity sensor 426 when the cell phone 4 is determined to be in the stationary state, be an offset value. Then, the calibration portion 470 reads out the past measured value of the angular velocity sensor 426 (angular velocity information 476), calibrates it by Equation 3, and updates it. Thus, the measured value already recorded is calibrated. Thereafter the calibration portion 470 calibrates the measured value in Step S11 by Equation 3 and records it.

In this manner, in the positioning system 1, calibration of the acceleration sensor 425 and the angular velocity sensor 426 are completed by execution of Steps S17 and S18. At a time at which Step S18 has been executed, the calibration portion 470 is returned to a state in which thereafter it determines to be No in Step S15. However, in a case where a new calibration timing is notified, the calibration portion 470 may be placed again in the state in which it determines to be Yes in Step S15.

In the position recording processing, when the calibration information 450 has been transmitted from the phone portion 40, the orientation identification portion 471 is placed in a state in which thereafter it determines to be Yes in Step S19. Subsequently, by execution of Step S11, the orientation identification portion 471 is placed in a state in which, while referring to the acceleration information 475 and the angular velocity information 476 that are generated as needed, the orientation identification portion 471 detects a walking operation of the user (more specifically, an operation of walking through a passage formed by the housing 30) (Step S20).

When detecting the walking operation, the orientation identification portion 471 determines to be Yes in Step S20 and performs orientation calibration processing (Step S21). In Step S21, the orientation identification portion 471 calibrates orientation information 477 so that the direction of the detected walking operation (the traveling direction of the user) is the reference direction 453 contained in the calibration information 450 already acquired.

For example, even if the direction of the detected walking operation is "northeast" in accordance with the measured value of the magnetic sensor 427, when the reference direction 453 is "north," the orientation information 477 is calibrated so that the direction of that walking direction is "north." Thereafter the orientation identification portion 471 calibrates the measured value in Step S11 and records it. Please note that the measured value of the angular velocity sensor 426 calibrated as described above may have higher reliability than the measured value of the magnetic sensor 427 in some cases. Therefore, as for the orientation information 477, the determination may be made by referring to the measured value of the angular velocity sensor 426 (angular velocity information 476).

When Step S21 has been performed, the moving amount calculation portion 472 calculates the relative moving amount again based on the acceleration information 475, the angular velocity information 476, and the orientation information 477 that were calculated (all of which were calculated retrospectively), and updates the relative moving amount information 478 (Step S22).

Then, the position identification portion 473 converts the relative moving amount information 478 to an absolute position based on the absolute position 452 at the reference time 451, to generate record information 429 (Step S23).

After Step S23 has been executed, it is determined to be Yes in Step S13 and the position identification portion 473 updates the record information 429 based on newly generated relative moving amount information 478 (Step S14). That is, a new current position is recorded as a position which is moved from the current position in the record information 429 recorded immediately before by the relative moving amount information 478.

As described above, the positioning system 1 in the preferred embodiment includes the cell phone 4 carried by the user, the ticket gate 3 having the absolute position that is known, and the housing provided to correspond to the ticket gate 3 and to regulate the user's traveling direction to be the reference direction. The cell phone 4 includes: the contactless IC card portion 41 which acquires individual information 800 of the ticket gate 3; the position identification portion 473 which identifies the absolute position of the user by acquiring the absolute position of the ticket gate 3 in accordance with the individual information 800 acquired by the contactless IC card portion 41; the acceleration sensor 425 which detects an acceleration when the user moves; the angular velocity sensor 426 which detects the angular velocity when the user moves; the calibration portion 470 which calibrates the acceleration sensor 425 and the angular velocity sensor 426 in accordance with detection results of the acceleration sensor 425 and the angular velocity sensor 426 when the cell phone 4 is substantially stationary; and the orientation identification portion 471 which identifies orientation information 477 in accordance with detection results output from the acceleration sensor 425 and the angular velocity sensor 426 when the housing 30 regulates the traveling direction of the user to be the reference direction. Thus, it is possible to acquire the absolute position and orientation of the user without relying on GPS or the magnetic sensor 427.

The ticket gate 3 includes the contactless IC card reader 31, the cell phone 4 includes the contactless IC card portion 41, and the contactless IC card portion 41 and the contactless IC card reader 31 can perform data communication with each other. Therefore, contactless IC card architecture which has already been widely spread in markets can be employed, so that versatility of the system can be ensured and the setting-up cost can be suppressed.

The calibration portion 470 determines that the cell phone 4 is substantially stationary around a period during which the contactless IC card portion 41 and the contactless IC card reader 31 performs data communication with each other, thereby can detect a state in which the cell phone 4 is stationary easily.

Moreover, the calibration portion 470 determines that the cell phone 4 is substantially stationary around the period during which the contactless IC card portion 41 and the contactless IC card reader 31 performs data communication with each other in a case where the amount of change is a threshold value or less in the detection result output from the acceleration sensor 425. Thus, it is possible to more precisely detect the state in which the cell phone 4 is stationary.

In addition, the calibration portion 470 determines that the cell phone 4 is substantially stationary when the user is performing an entry operation or an exit operation (i.e., the communication enabling operation) for the ticket gate 3 by the cell phone 4. Thus, it is possible to calibrate the acceleration sensor 425 and the angular velocity sensor 426 without making the user aware of the calibration operation. Therefore, the user's burden can be reduced.

Moreover, the contactless IC card portion 41 acquires the individual information 800 of the ticket gate 3 from the ticket gate 3 when the user is performing the entry operation or the exit operation for the ticket gate 3 by the cell phone 4. Thus, it is possible to calibrate the acceleration sensor 425, the angular velocity sensor 426, and the magnetic sensor 427 without making the user aware of the calibration operation (the operation for acquiring the individual information 800). Therefore, the user's burden can be reduced.

In addition, in the positioning system 1 in the preferred embodiment, only the communication enabling operation by the user for the ticket gate 3 enables calibration of the acceleration sensor 425, the angular velocity sensor 426, and the magnetic sensor 427 and also enables acquisition of the absolute position and the absolute orientation of the user.

Moreover, the positioning system 1 further includes the server device 2 which can perform data communication with the cell phone 4 through the network 90. The server device 2 includes an index database 200 which stores the individual information of the ticket gate 3, the absolute position of the ticket gate 3, and the reference direction of the housing 30 corresponding to the ticket gate 3 such that those are associated with one another. The cell phone 4 transmits the individual information 800 of the ticket gate 3 acquired by the contactless IC card portion 41 to the server device 2, and in accordance with the individual information 800 of the ticket gate 3 transmitted from the cell phone 4, the server device 2 transmits the absolute position of the ticket gate 3 and the reference direction of the housing 30 corresponding to the ticket gate 3, that are stored in the index database 200, to the cell phone 4. Thus, the ticket gate 3 already installed can be used as it is.

In the preferred embodiment, the description is made by referring to a ticket gate 3 which is installed in a station as an exemplary index element. However, as an example in which a user's behavior when the user enters or exits (mainly the moving direction of the user) is expected to specify the traveling direction of the user, the index element may be a gate which is installed in a theme park, an amusement park, amusement facilities, or the like. It is necessary to regulate the behavior of the user who has not paid the entrance fee when the user has entered (or exit) also in the theme park and the amusement park, and it is possible to efficiently make the user perform the communication enabling operation as in the ticket gate 3.

Also in an entrance of a shopping mall or a commercial store, the traveling direction of the user can be estimated with high precision, as in the ticket gate. Therefore, a device corresponding to the index element at an entrance of such a facility may be installed to identify the traveling direction of the user who is entering. For example, when a point addition device which adds visiting reward points, a coupon issuing device, or the like is installed at an entrance of a shopping mall or a commercial store as the index element, it is possible to efficiently make a user perform the communication enabling operation as in the ticket gate 3. In other words, a manner which makes a user voluntarily perform the communication enabling operation is not limited to processing for collecting a fee or charge such as a fare or an entrance fee.

In the preferred embodiment, it is described that the reference time 451 is transmitted to the sensor portion 42 while being contained in the calibration information 450. However, in this embodiment, the index information 201 is acquired from the server device 2 via the network 90. Therefore, there is a time lag between a time at which the reference time 451 is recorded by the calibration instruction portion 440 and a time at which the absolute position 452 and the reference direction 453 of the ticket gate 3 are obtained. Thus, when recording the reference time 451, the calibration instruction portion 440 may immediately transmit that reference time 451 to the sensor portion 42. Alternatively, at least one of the calibration timing and the reference time 451 may be notified from the contactless IC card portion 41 to the sensor portion 42 directly at a timing at which the individual information 800 is received in the contactless IC card portion 41.

Moreover, a time period for which calibration is performed retrospectively may be limited. For example, calibration may go back to a middle point between the previous reference time 451 and the current reference time 451 such that only measured values after that middle point are calibrated. Alternatively, the time period for which calibration is performed retrospectively may be set in advance to a predetermined value.

The technique for estimating the user's traveling direction without making the user aware of the estimation is not limited to a technique which monitors entrance/exit of users as described in the above preferred embodiment.

Figure 7:
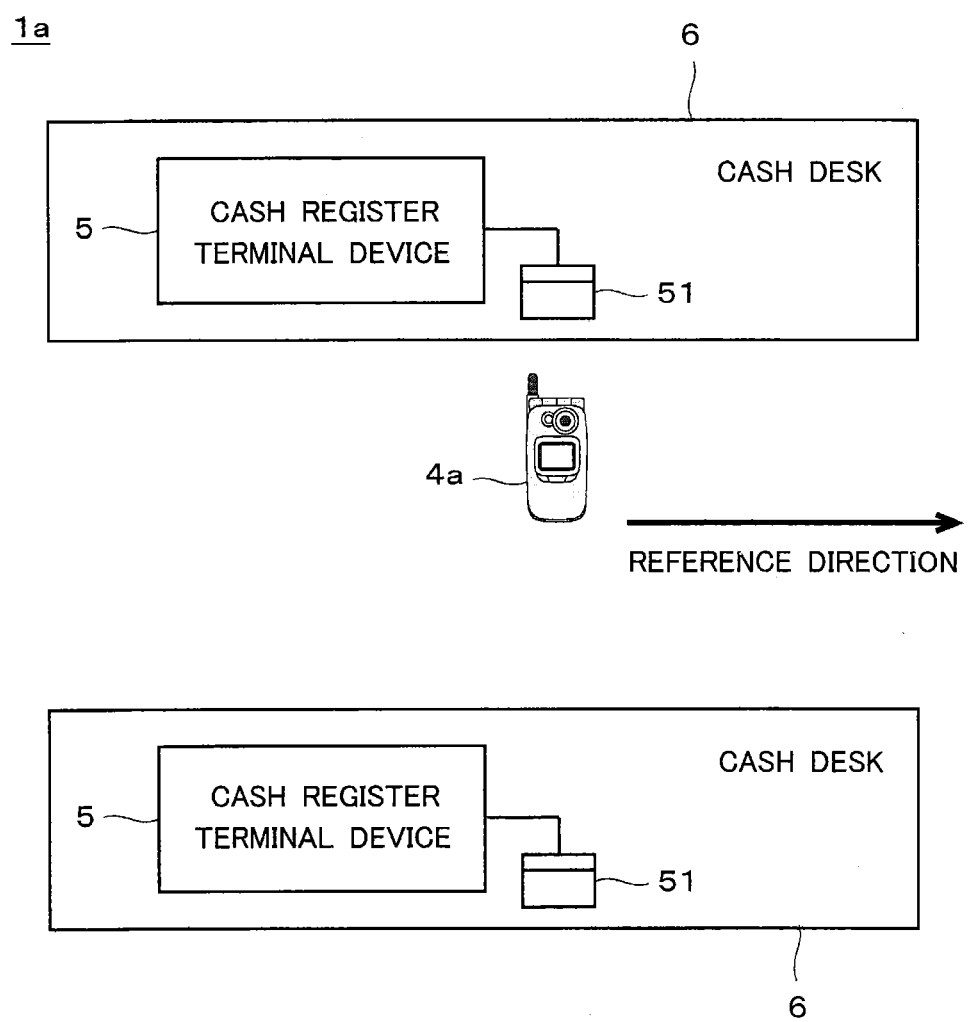
FIG. 7 shows a positioning system in another preferred embodiment of the present invention.

FIG. 7 is a diagram showing a positioning system 1a in another preferred embodiment. The positioning system 1a includes a cell phone 4a, a cash register terminal device 5, and a cash desk 6. FIG. 7 shows a layout of a general payment counter at which payment of a good to be purchased is performed, when seen from above.

The positioning system 1a in the other preferred embodiment is different from the positioning system 1 in the above preferred embodiment in that the former one does not include the server device 2 but includes the cash register terminal device 5 in place of the ticket gate 3. In the following description, for the positioning system 1a of this embodiment, the same functions and components as those of the positioning system 1 are labeled with the same reference signs as those in the positioning system 1 and the description thereof is appropriately omitted.

The cash register terminal device 5 is provided with a contactless IC card reader 51 which is connected to a main body via a cable or the like, and is placed on the top surface of the cash desk 6. The cash register terminal device 5 is operated by a cash register clerk to calculate the price of the good carried by a customer to the cash desk 6 (the good to be purchased) and present that price to the customer.

The contactless IC card reader 51 can perform proximity wireless communication with a general contactless IC card to read various kinds of information stored in the contactless IC card and send various kinds of information to the contactless IC card. Especially, the contactless IC card reader 51 in this embodiment can perform data communication with a contactless IC card portion 41 of the cell phone 4a, thereby performing payment of the purchase (payment processing). To such a contactless IC card reader 51, a conventional technique can be applied. Therefore, the details are omitted.

In this embodiment, by an operation performed by a user to bring the cell phone 4a close to the contactless IC card reader 51 and place it above the reader 51, processing related to payment of the purchase (payment processing) is executed. That operation by the user is also referred to as a communication enabling operation in this embodiment.

The cash desk 6 forms a table on which the cash register terminal device 5 is placed and also has a function of a guide member for regulating a traveling direction of a customer which finished payment to a reference direction.

Figure 8:
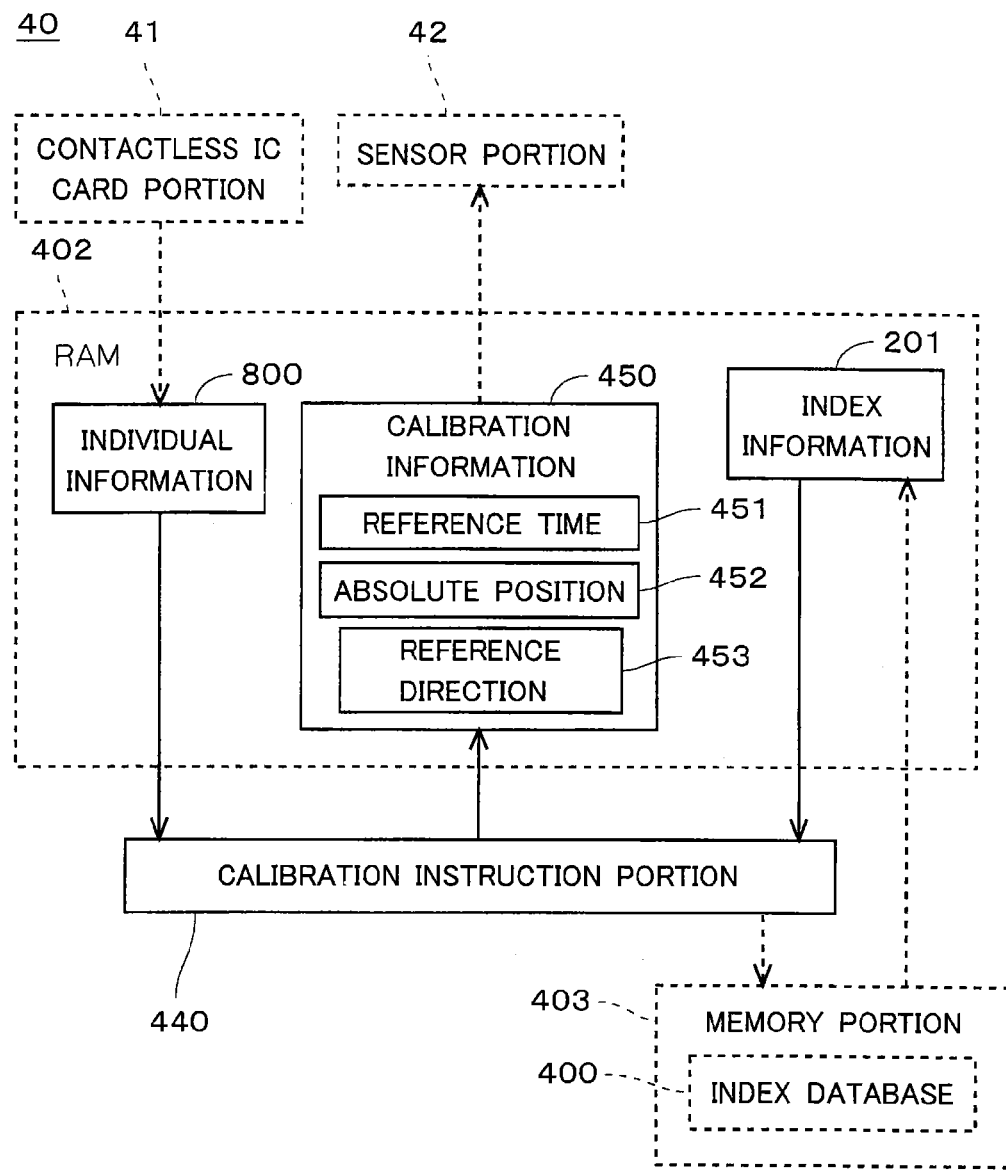
FIG. 8 is a diagram showing functional blocks provided in a phone portion of a cell phone in the other preferred embodiment of the present invention, with a data flow.

FIG. 8 is a diagram showing functional blocks provided in a phone portion 40 of the cell phone 4a in the other preferred embodiment of the present invention, together with a data flow. In the cell phone 4a, an index database 400 is constructed in a memory portion 403. The description of the structure of the index database 400 and the like are omitted because the index database 400 can be constructed in the same manner to the index database 200.

As described above, the cell phone 4a in the other preferred embodiment can acquire index information 201 without making an access to an external server device 2, unlike the above-described preferred embodiment, because the index database 400 is constructed in an internal storage device (memory portion 403). That is, when the individual information 800 has been acquired, a calibration instruction portion 440 included in the other preferred embodiment can read the index information 201 onto a RAM 402 by making a search using identification information of the cash register terminal device 5 contained in that individual information 800 as a search key.

The structure, functions, and operations other than those described above can be realized in the same manner to that of the positioning system 1 in the above-described preferred embodiment, and therefore the description thereof are omitted.

As described above, also in the positioning system 1a in the other preferred embodiment, the same effects as those obtained in the positioning system 1 in the above-described preferred embodiment can be obtained.

Moreover, the calibration portion 470 determines that the cell phone 4a is substantially stationary when the user is performing a payment operation to the cash register terminal device 5 with the cell phone 4a, thereby can calibrate an acceleration sensor 425 and an angular velocity sensor 426 without making the user aware of the calibration operation. Therefore, the user's burden can be reduced.

Moreover, when the user is performing the payment operation to the cash register terminal device 5 with the cell phone 4a, the contactless IC card portion 41 acquires the individual information 800 of that cash register terminal device 5 therefrom, thereby can calibrate the acceleration sensor 425 and the angular velocity sensor 426 without making the user aware of the calibration operation. Therefore, the user's burden can be reduced.

In addition, the cell phone 4a includes the memory portion 403 which stores the individual information of the cash register terminal device 5, the absolute position of the cash register terminal device 5, and the reference direction of the cash desk 6 corresponding to the cash register terminal device 5 such that those are associated with one another. In accordance with the individual information 800 of the cash register terminal device 5 acquired by the contactless IC card portion 41, the position identification portion 473 acquires the absolute position of that cash register terminal device 5 stored in the memory portion 403. In accordance with the individual information 800 of the cash register terminal device 5 acquired by the contactless IC card portion 41, the orientation identification portion 471 acquires the reference direction of the cash desk 6 corresponding to the cash register terminal device 5 that are stored in the memory portion 403. Thus, a cash register terminal device which has been already installed can be used as the cash register terminal device 5 as it is. Moreover, as compared with a case in which an access to the server device 2 is made every time, the index information 201 can be acquired in a shorter time.

A technique for constructing the index database 400 in the memory portion 403 of the cell phone 4a may be downloaded from an external computer as application software and installed in advance. Alternatively, information provided by a portable recording medium such as an SD card may be attached to the cell phone 4a and used.

In the positioning system 1a in this embodiment, a plurality of cash register terminal devices 5 and cash desks 6 are provided. However, even when one cash register terminal device 5 and one cash desk 6 are used, a customer's traveling direction can be regulated and a user's traveling direction can be highly precisely estimated by the communication enabling operation. In other words, the number of the cash register terminal devices 5 and the number of cash desks 6 are not limited to those described in the above embodiment.

Moreover, the positioning system 1a may be constructed such that, while the cash register terminal device 5 is used as the index element, the index information 201 is acquired from the server device 2 as in the aforementioned preferred embodiment. Furthermore, the positioning system 1a may be constructed such that, while the ticket gate 3 is used as the index element as in the aforementioned preferred embodiment, the index database 400 is constructed in the cell phone 4a as in this embodiment. Alternatively, those may be mixed.

In the above embodiment, an example is described in which calibration of self-contained sensors, acquisition of the absolute values, and acquisition of the absolute orientation are performed in accordance with the payment processing or point-addition processing. However, it is not necessary that calibration is associated with those processing.

Figure 9:
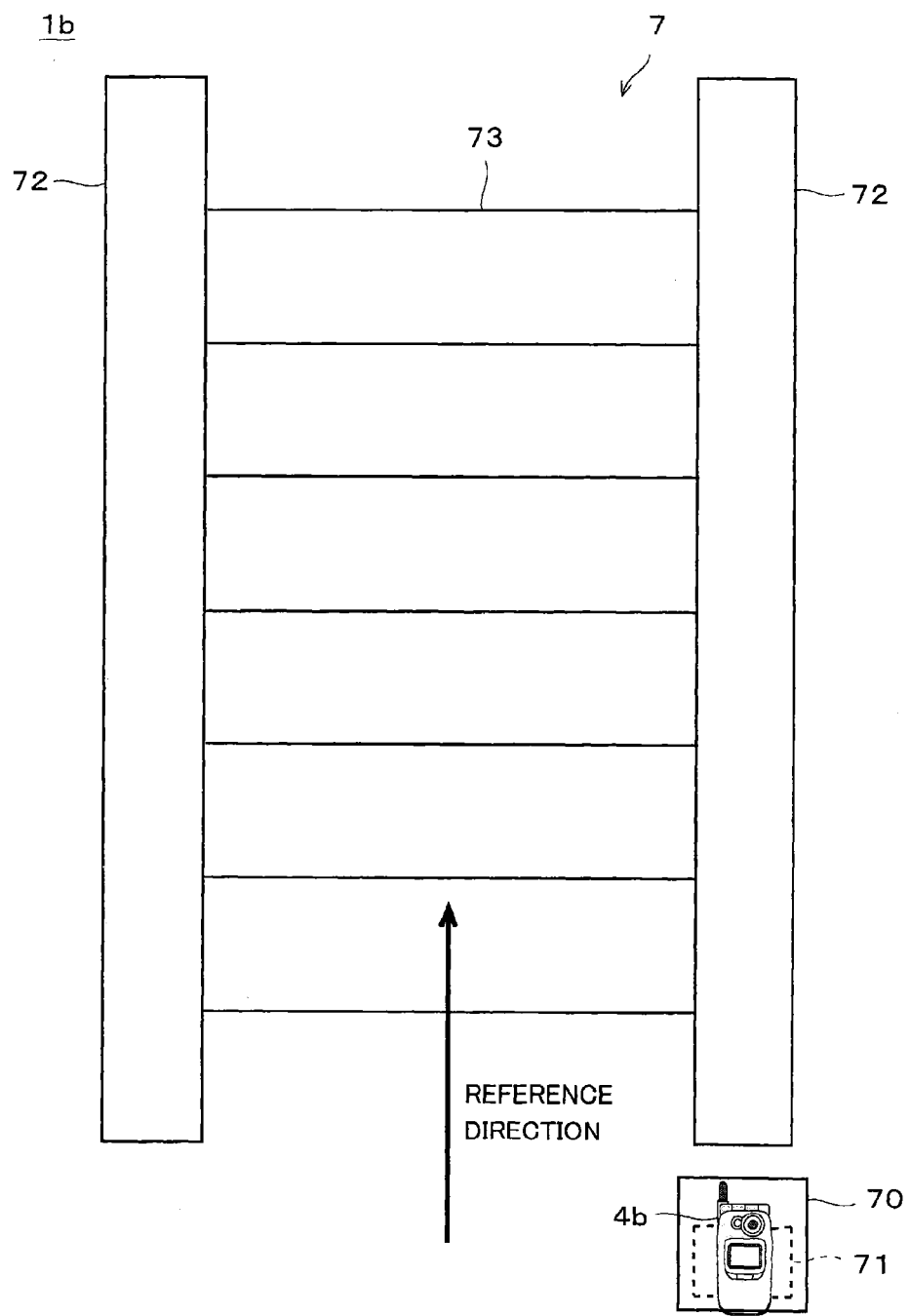
FIG. 9 is a diagram showing a positioning system in a still another preferred embodiment of the present invention.

FIG. 9 is a diagram showing a positioning system 1b in still another preferred embodiment. The positioning system 1b includes a cell phone 4b and a moving walkway 7.

The positioning system 1b in the still other embodiment is different from the positioning system 1a in the other preferred embodiment in that the cell phone 4b is provided in place of the cell phone 4a and the moving walkway 7 is provided in place of the cash register terminal device 5 and the cash desk 6. Hereinafter, for the positioning system 1b in this embodiment, the same components as those in the positioning system 1a in the other preferred embodiment are labeled with the same reference signs as those in the positioning system 1a and the description thereof are omitted as appropriate.

The moving walkway 7 includes a communication device 70, a contactless IC card reader 71 arranged inside the communication device 70, a pair of handrail members 72, and a movable floor member 73. The moving walkway 7 defines a so-called moving sidewalk and has a walking assisting function for conveying a person standing on the floor member 73 in a predetermined direction.

The communication device 70 is a columnar structure standing from the floor surface and has the contactless IC card reader 71 therein as described before.

The contactless IC card reader 71 can perform proximity wireless communication with a general contactless IC card to read various kinds of information stored in the contactless IC card and send various kinds of information to the contactless IC card. In other words, a user can acquire information from the contactless IC card reader 71 by performing a communication enabling operation for the contactless IC card reader 71 with the cell phone 4*b* immediately before riding on the moving walkway 7.

The pair of handrail members 72 define a passage through which a passenger (user) passes, and the user performs a walking operation in a reference direction until the user reaches the floor member 73. That is, in the positioning system 1*b*, the handrail members 72 correspond to a guide member.

Figure 10:
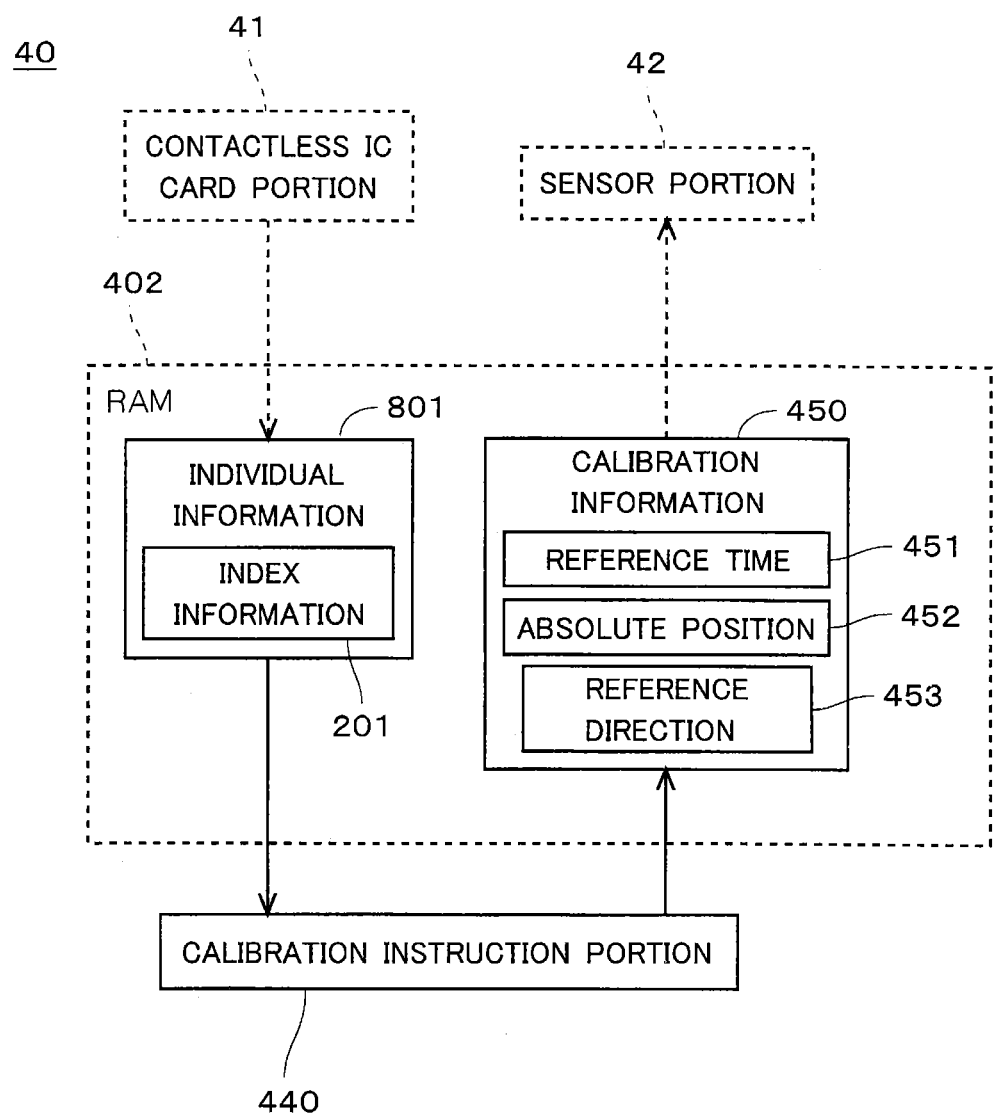
FIG. 10 is a diagram showing functional blocks provided in a phone portion in a cell phone in the still other preferred embodiment of the present invention, with a data flow.

FIG. 10 is a diagram showing functional blocks provided in a phone portion 40 of the cell phone 4*b* in the still other preferred embodiment, together with a data flow.

The contactless IC card portion 41 of the cell phone 4*b* receives individual information 801 from the contactless IC card reader 71. In other words, when the user performs the communication enabling operation, the contactless IC card reader 71 transmits the individual information 801 to the cell phone 4*b*.

Therefore, the phone portion 40 of the cell phone 4*b* receives the individual information 801 from the contactless IC card portion 41. As shown in FIG. 10, the individual information 801 is information containing index information 201. That is, the individual information 801 in the other preferred embodiment is different from the individual information 800, but contains an absolute position of the moving walkway 7 (absolute position of the communication device 70) and the reference direction of the moving walkway 7 regulated by the pair of handrail members 72.

When the individual information 801 has been transmitted, a calibration instruction portion 440 in the still other preferred embodiment notifies of a calibration timing and records a reference time 451 immediately. Then, the calibration instruction portion 440 sets the absolute position contained in the individual information 801 (index information 201) as an absolute position 452 and also sets the reference direction contained in the individual information 801 to be a reference direction 453.

In other words, the calibration instruction portion 440 in the still other preferred embodiment is constructed such that it does not have to make a search in an index database (index database 200 or 400) by using identification information of the moving walkway 7 as a search key. Therefore, it does not takes a time until start of calibration by a calibration portion 470 or an orientation identification portion 471 in the still other preferred embodiment. Thus, a time until navigation starts can be reduced.

The structure, functions, and operations other than those described above can be realized in the same manner as that in the positioning system 1*a* in the other preferred embodiment, and therefore the description thereof is omitted.

As described above, the positioning system 1*b* in the still other embodiment employs the moving walkway 7 (communication device 70) as the index element and regulates the user's traveling direction to the reference direction by the pair of handrail members 72, thereby can obtain the same effects as those described in the above embodiments.

The individual information 801 of the moving walkway 7 contains the absolute position of the moving walkway 7 and the reference direction of the pair of handrail members 72 corresponding to the moving walkway 7. Therefore, the storage capacity of the terminal device can be suppressed, as compared with a case where the information (the absolute position and the reference direction) of each cash register terminal device 5 is stored in the cell phone 4*a* as in the other preferred embodiment. Moreover, as compared with a case where the information of each ticket gate 3 is acquired from the server device 2 as in the preferred embodiment, a terminal device which does not have a function of making an access to the server device 2 can be used.

An elevator, an escalator, or the like also has a function of regulating the user's traveling direction like the moving walkway 7. Therefore, when an entrance thereof is provided with a device corresponding to the index element, the traveling direction of the user who is walking can be highly precisely expected and the same effects as those described in this embodiment can be obtained.

The preferred embodiments of the present invention have been described above. However, the present invention is not limited to the above preferred embodiments but can be modified in various ways.

For example, the respective steps described above are merely examples, but do not limit the contents and the order thereof. For example, the contents and/or the order can be changed if the same effects can be obtained.

Moreover, the calibration instruction portion 440, the calibration portion 470, and the like described above are described as being realized by software by execution of the programs 80 and 81. However, a portion or all of those functional blocks may be implemented by exclusive logic circuit as hardware.

The positioning systems 1, 1*a*, and 1*b* can identify the user's absolute position without relying on GPS. However, the present invention does not necessarily exclude GPS. For example, the cell phone 4, 4*a*, or 4*b* may be constructed as a GPS terminal device such that identification of the absolute position described here and identification of the absolute position by the GPS complement mutually.

The terminal device is not limited to the cell phone 4, 4*a*, or 4*b*. For example, PAD, a smartphone, or a digital camera may be used.

The invention claimed is:

1. A positioning system comprising:
a terminal device carried by a user;
an index element having a known absolute position; and
a guide provided to correspond to the index element and regulate a traveling direction of the user to be a reference direction, wherein
the terminal device includes:
acquisition circuitry configured to acquire identification information of the index element, the identification information identifying the index element;
absolute-position identification circuitry configured to identify an absolute position of the user by acquiring the absolute position of the index element in accordance with the identification information acquired by the acquisition circuitry;
acceleration detection circuitry configured to detect an acceleration when the terminal device is moved;
angular-velocity detection circuitry configured to detect an angular velocity when the terminal device is moved;

calibration circuitry configured to determine that the terminal device is substantially stationary in a period during which the index element and the terminal device performs data communication with each other, and calibrate the acceleration detection circuitry and the angular-velocity detection circuitry in accordance with detection results of the acceleration detection circuitry and the angular-velocity detection circuitry when the terminal device is determined to be substantially stationary; and orientation identification circuitry configured to identify an orientation in accordance with detection results output from the acceleration detection circuitry and the angular-velocity detection circuitry when the guide regulates the traveling direction of the user to be the reference direction.

2. The positioning system according to claim 1, wherein the index element includes a contactless IC card reader, the terminal device includes a contactless IC card portion, and the index element and the terminal device performs the data communication with each other using the contactless IC card portion and the contactless IC card reader.

3. The positioning system according to claim 2, wherein the calibration circuitry determines that the terminal device is substantially stationary in the period during which the contactless IC card portion and the contactless IC card reader performs data communication with each other in a case where a change amount is a threshold value or less in the detection result output from the acceleration detection circuitry.

4. The positioning system according to claim 1, wherein the index element is a ticket gate,
the guide is a housing of the ticket gate, and
the calibration circuitry is further configured to determine that the terminal device is substantially stationary when the user is performing an entry operation or an exit operation for the ticket gate by the terminal device.

5. The positioning system according to claim 4, wherein the acquisition circuitry acquires the identification information of the ticket gate from the ticket gate when the user is performing the entry operation or the exit operation for the ticket gate by the terminal device.

6. The positioning system according to claim 1, wherein the index element is a cash register terminal device,
the guide is a cash desk on which the cash register terminal device is placed, and
the calibration circuitry is further configured to determine that the terminal device is substantially stationary when the user is making a payment operation for the cash register terminal device by the terminal device.

7. The positioning system according to claim 6, wherein the acquisition circuitry acquires the identification information of the cash register terminal device therefrom when the user is making the payment operation for the cash register terminal device by the terminal device.

8. The positioning system according to claim 1, further comprising a server capable of performing data communication with the terminal device through a network, wherein
the server includes a storage configured to store the identification information of the index element, the absolute position of the index element, and the reference direction of the guide corresponding to the index element such that those are associated with one another,
the terminal device transmits the identification information of the index element acquired by the acquisition circuitry to the server, and in accordance with the identification information of the index element transmitted from the terminal device, the server transmits the absolute position of the index element and the reference direction of the guide corresponding to the index element, that are stored in the storage, to the terminal device.

9. The positioning system according to claim 1, wherein the terminal device includes a storage configured to store the identification information of the index element, the absolute position of the index element, and the reference direction of the guide corresponding to the index element such that those are associated with one another,
the absolute-position identification circuitry acquires the absolute position of the index element stored in the storage in accordance with identification information of the index element acquired by the acquisition circuitry, and
the orientation identification circuitry acquires the reference direction of the guide corresponding to the index element stored in the storage, in accordance with the identification information of the index element acquired by the acquisition circuitry.

10. The positioning system according to claim 1, wherein the identification information of the index element includes the absolute position of the index element and the reference direction of the guide corresponding to the index element.

11. The positioning system according to claim 1, wherein the terminal device further includes magnetism detection circuitry configured to detect terrestrial magnetism.

12. A terminal device to be carried by a user, comprising:
acquisition circuitry configured to acquire identification information of an index element which is arranged outside and has a known absolute position, the identification information identifying the index element;
absolute-position identification circuitry configured to identify an absolute position of the user by acquiring the absolute position of the index element in accordance with the identification information acquired by the acquisition circuitry;
acceleration detection circuitry configured to detect an acceleration when the terminal device is moved;
angular-velocity detection circuitry configured to detect an angular velocity when the terminal device is moved;
calibration circuitry configured to determine that the terminal device is substantially stationary in a period during which the index element and the terminal device performs data communication with each other, and calibrate the acceleration detection circuitry and the angular-velocity detection circuitry in accordance with detection results of the acceleration detection circuitry and the angular-velocity detection circuitry when the terminal device is determined to be substantially stationary; and
orientation identification circuitry configured to identify an orientation, in accordance with detection results output from the acceleration detection circuitry and the angular-velocity detection circuitry when a guide arranged outside to correspond to the index element regulates a traveling direction of the user to be a reference direction.

13. A non-transitory computer readable medium including executable instructions, which when executed by a computer carried by a user cause the computer to execute a positioning method, the method comprising:

acquiring identification information of an index element which is arranged outside and has a known absolute position, the identification information identifying the index element;

identifying an absolute position of the user by acquiring the absolute position of the index element in accordance with the acquired identification information;

detecting an acceleration by acceleration detection circuitry when the computer is moved;

detecting an angular velocity by angular-velocity detection circuitry when the computer is moved;

determining that the computer is substantially stationary in a period during which the index element and the computer performs data communication with each other;

calibrating the acceleration detection circuitry and the angular-velocity detection circuitry in accordance with detection results of the acceleration detection circuitry and the angular-velocity detection circuitry when the computer is determined to be substantially stationary; and identifying an orientation in accordance with detection results output from the acceleration detection circuitry and the angular-velocity detection circuitry when a guide arranged outside to correspond to the index element regulates a traveling direction of the user to be a reference direction.

14. A positioning method comprising:

acquiring identification information of an index element having a known absolute position;

identifying an absolute position of a user carrying a terminal device by acquiring the absolute position of the index element in accordance with the acquired identification information, the identification information identifying the index element;

detecting an acceleration by acceleration detection circuitry of the terminal device when the terminal device is moved;

detecting an angular velocity by angular-velocity detection circuitry of the terminal device when the terminal device is moved;

determining that the terminal device is substantially stationary in a period during which the index element and the terminal device performs data communication with each other;

calibrating the acceleration detection circuitry and the angular-velocity detection circuitry in accordance with detection results of the acceleration detection circuitry and the angular-velocity detection circuitry when the terminal device carried by the user is determined to be substantially stationary; and identifying an orientation in accordance with detection results output from the acceleration detection circuitry and the angular-velocity detection circuitry when a guide arranged to correspond to the index element regulates a traveling direction of the user to be a reference direction.

\* \* \* \* \*